United States Patent
Nikitin et al.

(10) Patent No.: US 9,007,178 B2
(45) Date of Patent: *Apr. 14, 2015

(54) UTILIZATION OF MOTION AND SPATIAL IDENTIFICATION IN RFID SYSTEMS

(71) Applicant: Intermec IP Corp., Everett, WA (US)

(72) Inventors: Pavel V. Nikitin, Seattle, WA (US); Gary Neal Spiess, Lisbon, IA (US); Hunter Martin Leland, Cedar Rapids, IA (US); Lynn Carl Hingst, Center Point, IA (US); John Howland Sherman, Crystal Lake, IL (US)

(73) Assignee: Intermec IP Corp., Everett, WA (US)

( * ) Notice: Subject to any disclaimer, the term of this patent is extended or adjusted under 35 U.S.C. 154(b) by 215 days.

This patent is subject to a terminal disclaimer.

(21) Appl. No.: 13/794,325

(22) Filed: Mar. 11, 2013

(65) Prior Publication Data

US 2014/0197926 A1 Jul. 17, 2014

Related U.S. Application Data

(63) Continuation-in-part of application No. 12/941,043, filed on Nov. 6, 2010, which is a continuation-in-part of application No. 12/371,429, filed on Feb. 13, 2009, now Pat. No. 8,237,563, and a continuation-in-part of (Continued)

(51) Int. Cl.
*G06K 7/10* (2006.01)

(52) U.S. Cl.
CPC ........ *G06K 7/10009* (2013.01); *G06K 7/10108* (2013.01); *G06K 7/10356* (2013.01)

(58) Field of Classification Search
USPC ................ 340/10.1, 10.2, 10.31, 10.32, 10.4, 340/10.5, 10.52, 572.1, 572.7, 572.9
See application file for complete search history.

(56) References Cited

U.S. PATENT DOCUMENTS

| 6,204,765 B1 | 3/2001 | Brady et al. |
| 6,476,756 B2 | 11/2002 | Landt |

(Continued)

FOREIGN PATENT DOCUMENTS

| JP | A 2003-296666 | 10/2003 |
| WO | WO 2005/048476 | 5/2005 |

(Continued)

OTHER PUBLICATIONS

Yanakiev et al; "Assessment of the Physical Interface of UHF Passive Tags for Localization;" Eurasip RFID 2007 workshop.

(Continued)

*Primary Examiner* — Andrew Bee
*Assistant Examiner* — Yong Hang Jiang
(74) *Attorney, Agent, or Firm* — Oliff PLC; R. Brian Drozd

(57) ABSTRACT

In one aspect where a load or a subset of one or more tags is in motion relative to an RFID reader system, the RFID system obtains tag readings and derives tag scalar or vector motional data e.g. tag velocity, tag acceleration, and/or rate of change of tag acceleration which can be compared to known tag motional information to distinguish true tags of interest from false positives which are unavoidably also within the field of the reader system. An antenna system may also make readings during distinctive movement patterns of true tags, such as vertical or arcuate movement and utilize computed tag motional data based on the tag readings to distinguish true tags from false positives. Two components of the RFID system may communicate information on identified tags, and/or interact (e.g. by silencing tags), so as to cooperate in identifying true positive tags.

20 Claims, 15 Drawing Sheets

Related U.S. Application Data application No. 12/765,865, filed on Apr. 23, 2010, now abandoned, which is a continuation-in-part of application No. 12/371,429.

(60) Provisional application No. 61/028,626, filed on Feb. 14, 2008, provisional application No. 61/179,361, filed on May 18, 2009, provisional application No. 61/231,297, filed on Aug. 4, 2009, provisional application No. 61/232,427, filed on Aug. 8, 2009, provisional application No. 61/279,813, filed on Oct. 26, 2009, provisional application No. 61/340,198, filed on Mar. 13, 2010, provisional application No. 61/400,679, filed on Jul. 31, 2010, provisional application No. 61/735,266, filed on Dec. 10, 2012.

(56) References Cited

U.S. PATENT DOCUMENTS

| | | | |
|---|---|---|---|
| 6,600,443 B2 | 7/2003 | Landt | |
| 6,909,366 B1 | 6/2005 | Marsh et al. | |
| 7,030,761 B2 | 4/2006 | Bridgelall et al. | |
| 7,119,738 B2 | 10/2006 | Bridgelall et al. | |
| 7,170,412 B2 | 1/2007 | Knox et al. | |
| 7,323,977 B2 | 1/2008 | Kodukula et al. | |
| 7,567,179 B2 | 7/2009 | Stephensen et al. | |
| 7,962,308 B2 | 6/2011 | Makino | |
| 8,237,563 B2 | 8/2012 | Schatz et al. | |
| 8,248,210 B2 | 8/2012 | Nikitin et al. | |
| 8,537,014 B2* | 9/2013 | Broer | 340/572.1 |
| 2002/0183882 A1 | 12/2002 | Dearing et al. | |
| 2004/0030476 A1 | 2/2004 | Oswald et al. | |
| 2005/0210360 A1 | 9/2005 | Friedrich | |
| 2006/0170565 A1 | 8/2006 | Husak et al. | |
| 2006/0208892 A1* | 9/2006 | Ehrman et al. | 340/572.1 |
| 2006/0255951 A1 | 11/2006 | Roeder et al. | |
| 2007/0001814 A1 | 1/2007 | Steinke et al. | |
| 2007/0073513 A1 | 3/2007 | Posamentier | |
| 2007/0099623 A1 | 5/2007 | Stephensen et al. | |
| 2007/0109128 A1 | 5/2007 | Fujii et al. | |
| 2007/0197229 A1 | 8/2007 | Kalliola et al. | |
| 2007/0213869 A1 | 9/2007 | Bandringa et al. | |
| 2007/0241904 A1 | 10/2007 | Ozaki et al. | |
| 2007/0273530 A1 | 11/2007 | Koezuka et al. | |
| 2008/0111688 A1 | 5/2008 | Nikitin et al. | |
| 2008/0318682 A1 | 12/2008 | Rofougaran et al. | |
| 2009/0021351 A1 | 1/2009 | Beniyama et al. | |
| 2009/0021376 A1 | 1/2009 | Calvarese | |
| 2009/0207024 A1 | 8/2009 | Schatz et al. | |
| 2009/0326709 A1 | 12/2009 | Hooper et al. | |
| 2010/0266381 A1 | 10/2010 | Chilson et al. | |
| 2010/0274641 A1 | 10/2010 | Allen et al. | |
| 2010/0328073 A1 | 12/2010 | Nikitin et al. | |

FOREIGN PATENT DOCUMENTS

| | | |
|---|---|---|
| WO | WO 2007/035833 A2 | 3/2007 |
| WO | WO 2007/035833 A3 | 6/2007 |

OTHER PUBLICATIONS

Kim et al; "Automated Robot Docking Using Direction Sensing RFID;" 2007 IEEE International Conference on Robotics and Automation.

Zhang et al; "Localization and Tracking of Passive RFID Tags Based on Direction Estimation;" International Journal of Antennas and Propogation; 2007.

"Omron Announces New Gen 2 Interrogator;" http://www.rfidjournal.com/article/articlererview/2541/1/1, Feb. 8, 2006.

Liu et al; "Survey of Wireless Indoor Positioning Techniques and Systems;" IEEE Trans. on Syst., Man; Cybernetics; Nov. 2007.

Kusy et al; "Tracking Mobile Nodes Using RFID Doppler Shifts;" ACM SenSys conference; 2007.

"UHF Gen2 Tag Direction;" Impinj video http://impnj.com/rfid/in-action-videos.aspx; Mar. 2008.

"A Giant Step for RFID;" Mojix, Inc. http://www.mojix.com; copyright 2010; 1 page.

"Alien—Intelligent Tag Radar;" www.alientechnology.com/docs/products/AppNote_ITR.pdf; copyright 2008; 3 pages.

"How Mobile RFID Systems Improve Operations and ROI;" http://sparkmedialab.com/Intermec/First/ENG/mobile.html; Edition 1; 2007; 3 pages.

"Long Range RF Combat Identification Tag;" Spectra Research; http://spectra-research.com/sppdf/Rftag_flyer.pdf; 2005; 2 pages.

"Real Time Locating Systems Using Passive Tags—High Volume RTLS:" IDTechEx; http://www.idtechex.com/research/articles/real_time_locating_systems_using_passive_tags_high_volume_rtls_00001005.asp; copyright 1999-2011; 3 pages.

"RFID-radar™—How it works;" Trolley Scan (Proprietary) Ltd.; http://rfid-radar.com/howworks.html; accessed May 24, 2011; 5 pages.

"RF Controls—Welcome to RF Controls;" http://www.rectrls.com; copyright 2008-2011; 1 page.

"Providing Custom Mobile and Embedded development services;" S5 Systems; http://www.s5systems.com/products/assettracking.html; accessed May 31, 2011; 1 page.

Jul. 1, 2014 Search Report issued in European Patent Application No. 14158680.

* cited by examiner

FIG. 2A
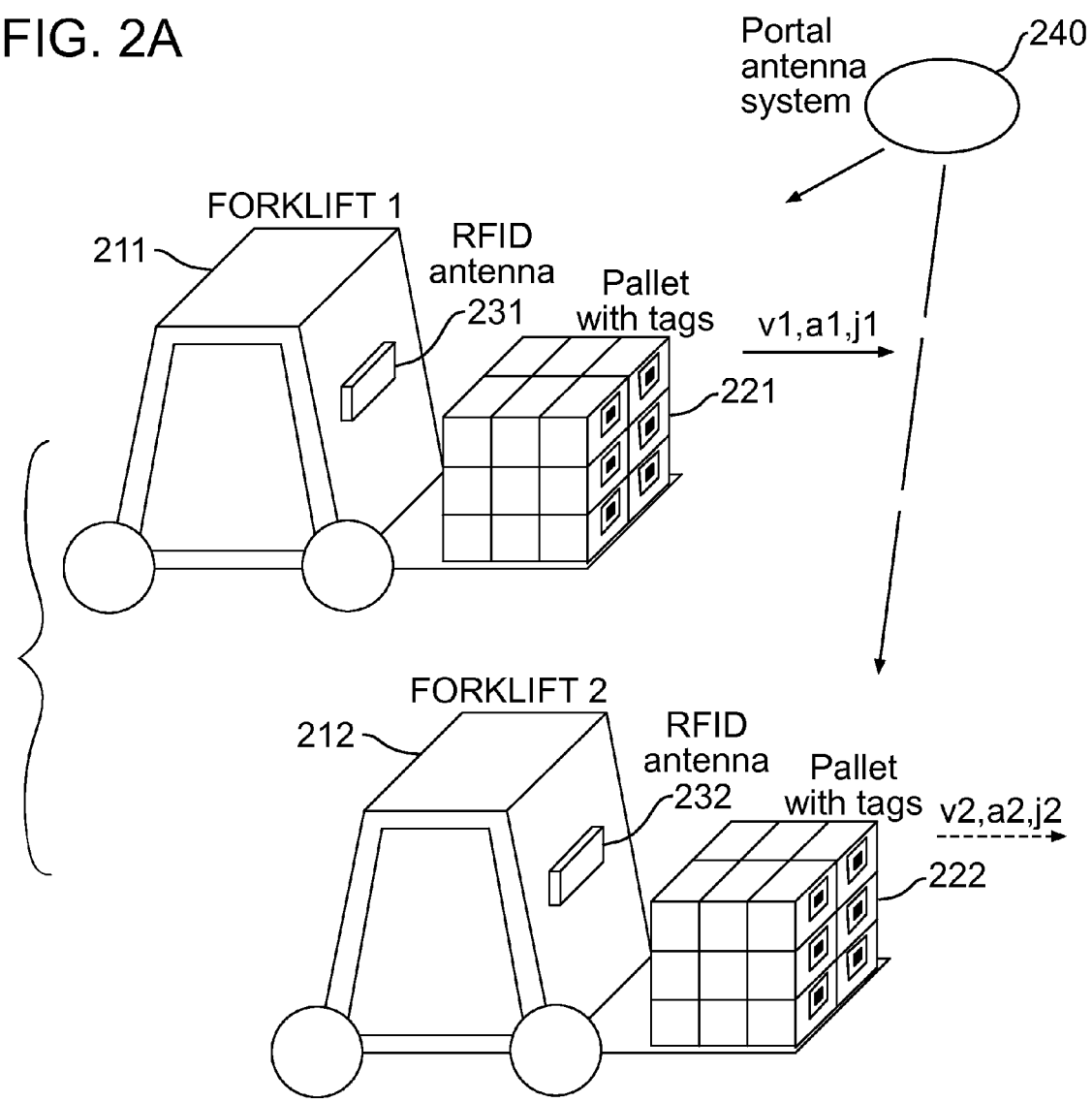
FIG. 2B
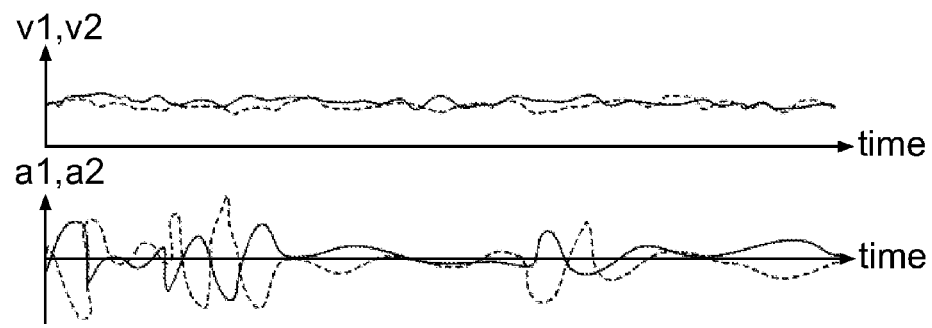
FIG. 2C

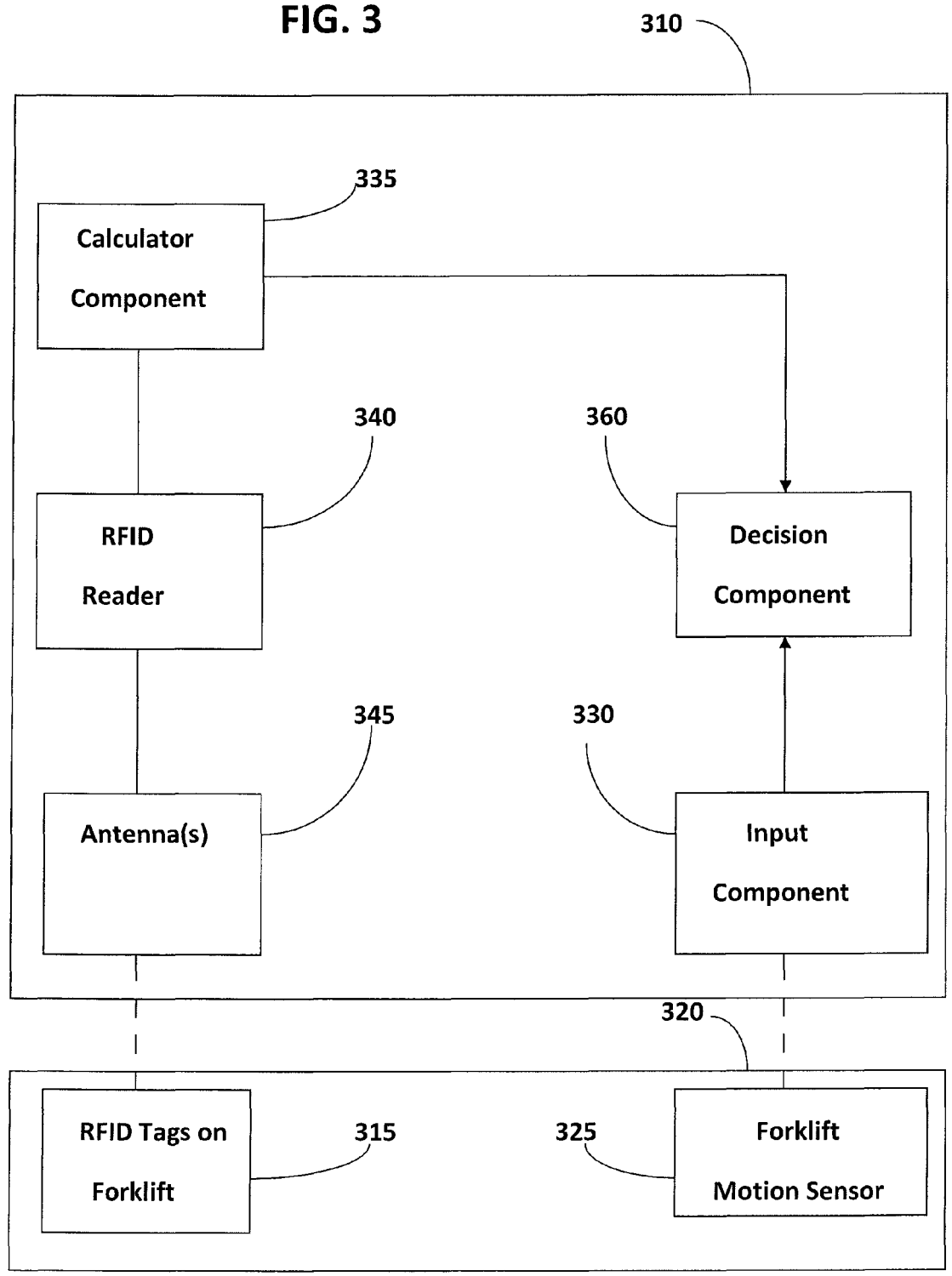

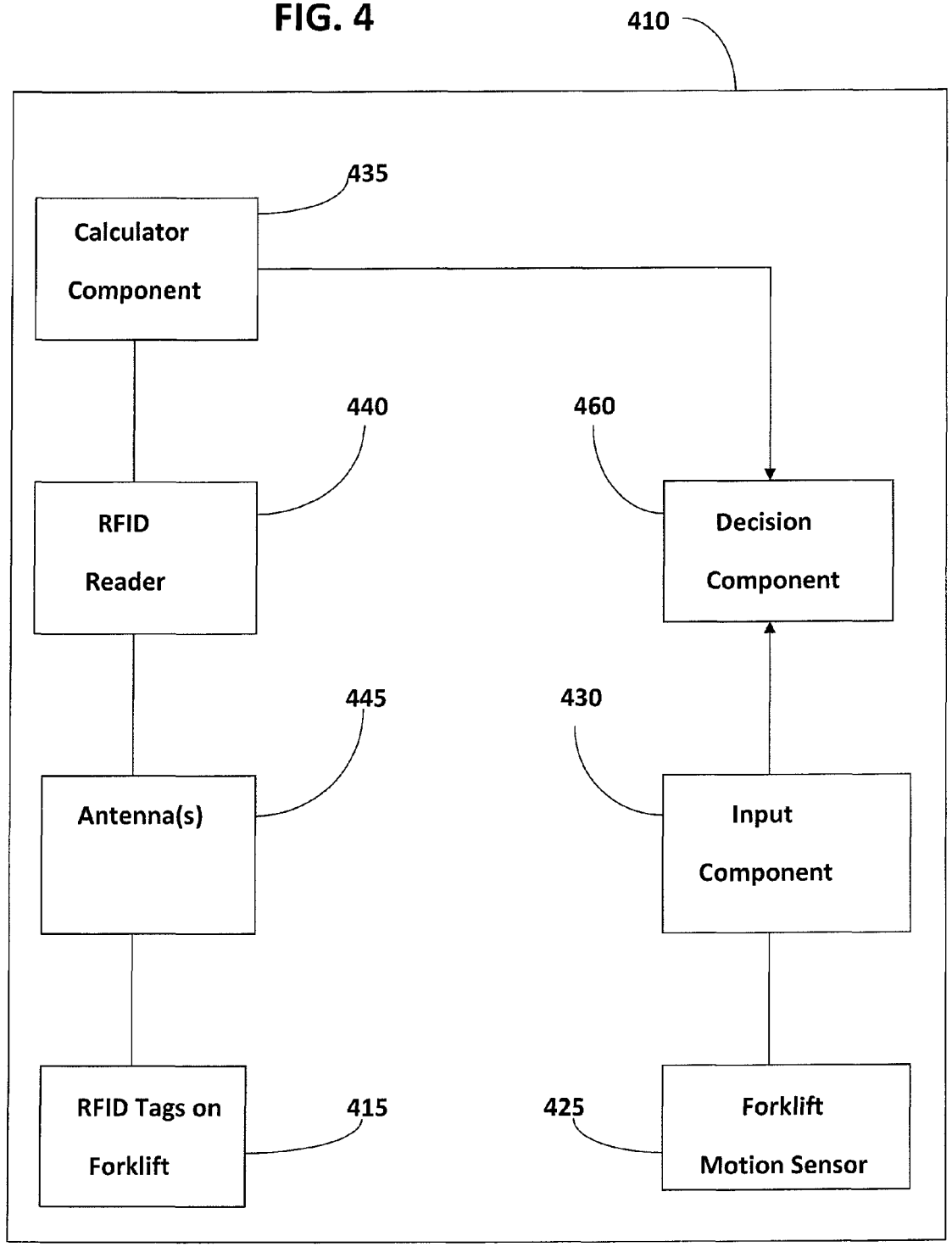

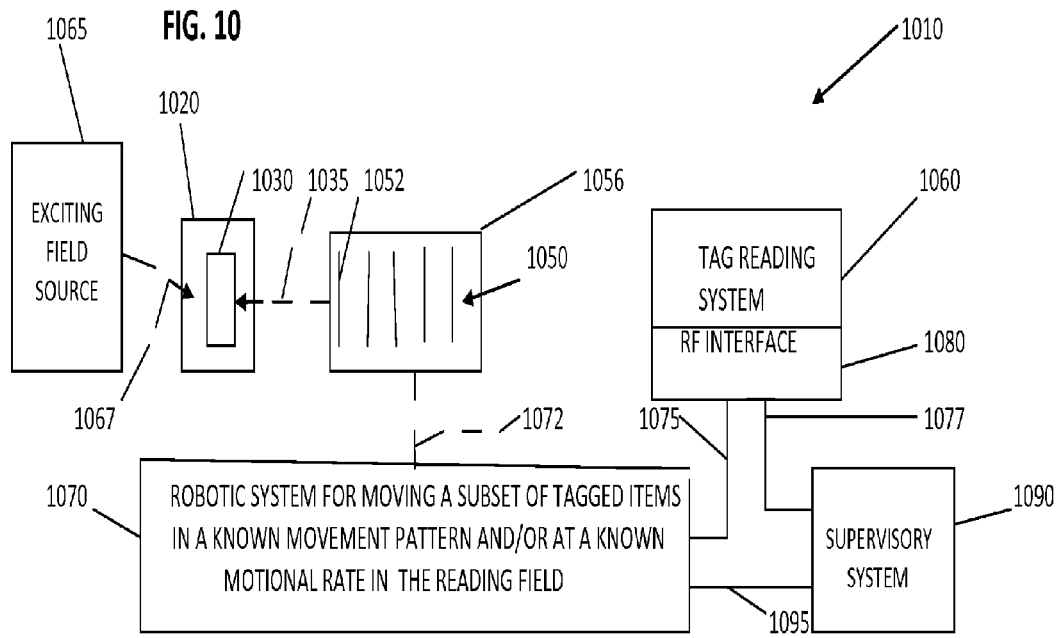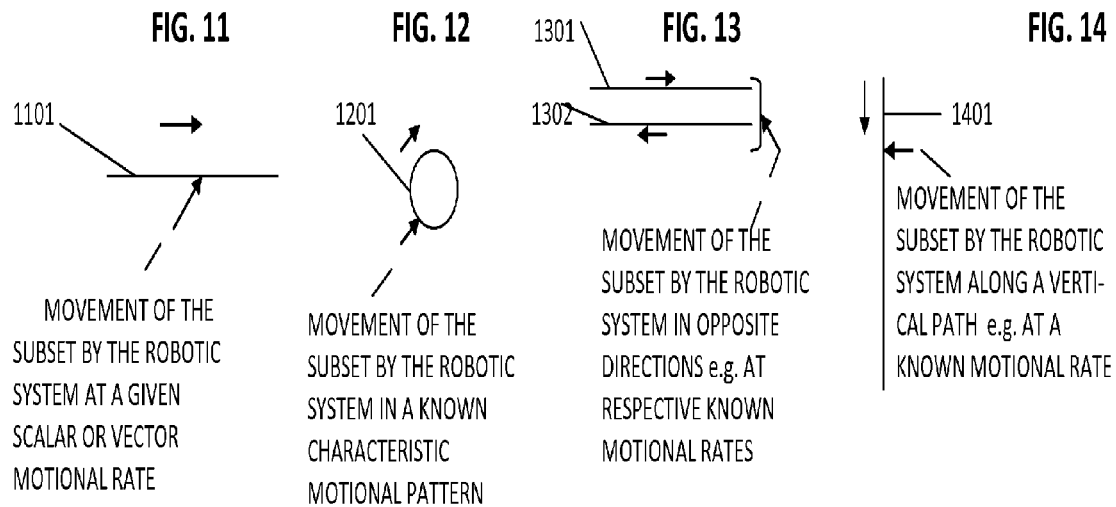

UTILIZATION OF MOTION AND SPATIAL IDENTIFICATION IN RFID SYSTEMS

CROSS-REFERENCE TO RELATED APPLICATIONS

This application is a continuation-in-part of application Ser. No. 12/941,043 filed Nov. 6, 2010, which is a continuation-in-part of application Ser. No. 12/765,865 filed Apr. 23, 2010, which is a continuation-in-part of application Ser. No. 12/371,429 filed Feb. 13, 2009, which was published as US 2009/0207024 A1 dated Aug. 20, 2009, and issued as U.S. Pat. No. 8,237,563 on Aug. 7, 2012, and which claims the benefit of U.S. Provisional Application No. 61/028,626 filed Feb. 14, 2008; this application claims the benefit of U.S. Provisional Application No. 61/735,266 filed Dec. 10, 2012; said application Ser. No. 12/765,865 claims the benefit of U.S. Provisional Applications No. 61/179,361 filed May 18, 2009, No. 61/231,297 filed Aug. 4, 2009, No. 61/232,427 filed Aug. 8, 2009; No. 61/279,813 filed Oct. 26, 2009, and No. 61/340,198 filed Mar. 13, 2010; said application Ser. No. 12/941,043 is a continuation-in-part of said application Ser. No. 12/371,429 filed Feb. 13, 2009, and claims the benefit of U.S. Provisional Applications No. 61/340,198 filed Mar. 13, 2010 aforesaid, and No. 61/400,679 filed Jul. 31, 2010; all of the foregoing patent applications including said provisional application 61/028,626, said nonprovisional application Ser. No. 12/371,429, and said published application US 2009/0207024 A1 are hereby incorporated herein by reference in their entirety.

INCORPORATION BY REFERENCE

The following documents are hereby incorporated herein by reference in their entirety: application Ser. No. 12/371,429 filed Feb. 13, 2009, which was published as US 2009/0207024 A1 with a publication date of Aug. 20, 2009, and issued as U.S. Pat. No. 8,237,563 on Aug. 7, 2012; application Ser. No. 11/558,339 filed Nov. 9, 2006, which was published as US 2008/0111688 A1 with a publication date of May 15, 2008; application Ser. No. 11/672,776 filed Feb. 8, 2007, which was published as US 2007/0213869 A1 with a publication date of Sep. 13, 2007; Pavel Nikitin et al application Ser. No. 12/495,732 filed Jun. 30, 2009, which was published as US 2010/0328073 dated Dec. 30, 2010, and issued as U.S. Pat. No. 8,248,210 on Aug. 21, 2012; application Ser. No. 12/765,865 filed Apr. 23, 2010; U.S. Provisional Application No. 61/028,626 filed Feb. 14, 2008; U.S. Provisional Application No. 61/179,361 filed May 18, 2009; U.S. Provisional Application No. 61/231,297 filed Aug. 4, 2009; U.S. Provisional Application No. 61/232,427 filed Aug. 8, 2009; U.S. Provisional Application No. 61/279,813 filed Oct. 26, 2009; U.S. Provisional Application No. 61/340,198 filed Mar. 13, 2010, and "Phase Based Spatial Identification of UHF RFID Tags" by Nikitin, Martinez, Ramamurthy, Leland, Spiess, and Rao, presented at the IEEE RFID Conference at Orlando, Fla., Apr. 14-16, 2010 (Available to the public via IEEEXplore—identifier code 978-1-4244-5744-1/10/$26, copyright 2010 IEEE).

BRIEF DESCRIPTION OF THE DRAWING

FIG. 2A is a diagram illustrating the case where two forklifts are moving parallel to each other, each with its own pallet of tags, and with similar velocities. FIG. 2B shows plots of velocity as a function of time for the forklifts of FIG. 2A, and FIG. 2C shows the corresponding acceleration plots as a function of time, illustrating that acceleration motion parameters may provide a basis for distinguishing between tags on the two forklifts when the velocities are closely matched.

FIG. 3 shows a block diagram illustrating an exemplary system for identifying an RFID tag which is part of a forklift load by comparing tag motion parameters obtained from an RFID tag reader with motion parameters obtained from a motion sensor responsive to forklift movement as the forklift load moves through the field of the RFID reader.

FIG. 4 shows a block diagram of an example computer system that can be used e.g. with a forklift RFID reader to determine which RFID-tagged packages are moving with a forklift.

FIG. 10 is a diagrammatic illustration of a system for loading a pallet with one or more tagged items constituting a subset of a load, with a robotic system for moving the subset in a known movement pattern and/or at a known motional rate in the reading field.

FIG. 11 illustrates movement of the subset of tagged item or items by the robotic system at a given scalar or vector motional rate.

FIG. 12 is a diagrammatic illustration showing movement of the subset by the robotic system in a known characteristic motional pattern, e.g. along a circular path.

FIG. 13 is a diagrammatic illustration of the case where a subset is moved by the robotic system in respective opposite directions at respective motional rates.

FIG. 14 is a diagrammatic illustration of the case where the subset is moved by the robotic system along a vertical path, e.g. at a known motional rate.

FIG. 15 shows results when a handheld RFID reader is manually moved in a series of four forward and back motions (two slow and two faster) pointing at the center tag (ending in 89) of three tags. The other two tags are off to the sides at ~45 degree angles. FIG. 16 is for the case where the handheld RFID reader was sweep from left to right, then back from right to left parallel to the row of tags

DETAILED DESCRIPTION

RFID systems encounter difficulties in determining which tagged items are being processed, e.g. being transported by forklifts and other types of mobile devices, and which are not. Under certain conditions RFID readers may read tags which are far away, as being legitimate. Extraneous tag reads like these are difficult to filter out, and introduce significant inaccuracies into the system.

Various aspects of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. The term "forklift" is used herein generically to apply to devices for moving RFID tags whether guided by a human operator or robotically. Certain terms may even be emphasized below; however, any terminology intended to be interpreted in any restricted manner will be overtly and specifically defined as such in this Detailed Description section.

It would be useful to know the location of RFID-tagged packages in places like warehouses or distribution centers where there are a large number of tagged packages. In addition, the packages may be moved from one location to another, for example, to complete orders, to place packages into an order processing queue, or to assemble a cargo in a truck trailer or the like. Forklifts may be used to move large quantities of tagged packages. An RFID reader, whether mobile or stationary, may under certain conditions erroneously read and identify an extraneous tag as part of the forklift load when the tag is actually located on a shelf or elsewhere in the warehouse, or already on a truck trailer. Thus, there is a need for a system that can reliably provide information, for example to a forklift operator or to a database, as to what is being carried on a particular forklift load. More generally, a system would be highly desirable which would reliably distinguish RFID tags of interest from extraneous tags.

Figure 1:
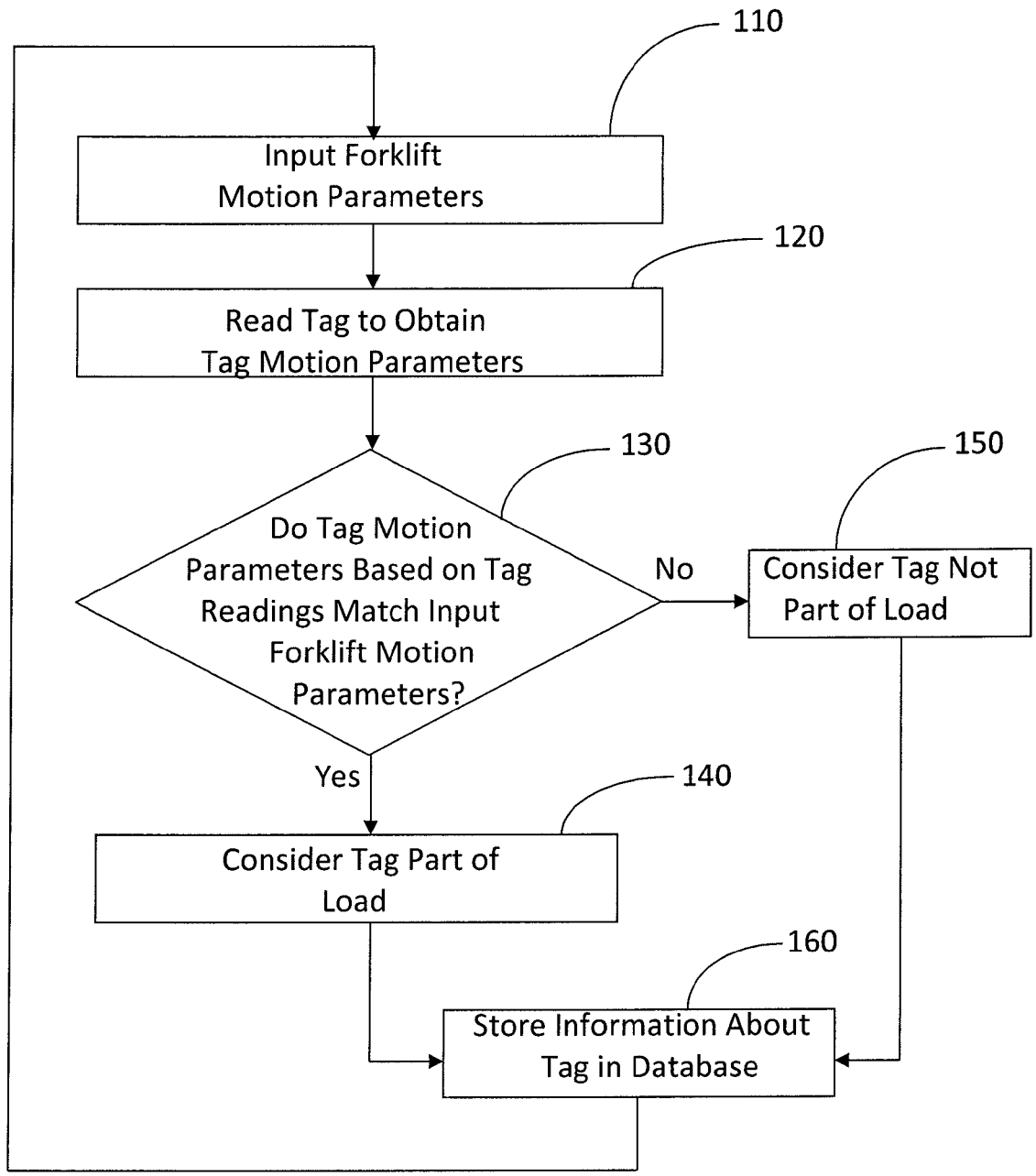
FIG. 1 is a flow diagram illustrating an example of a method of determining which RFID-tagged packages are on a forklift using a forklift motion parameter input and tag motion parameters obtained by a portal reader system or the like arranged along the path of movement of the forklift.

Description of FIG. 1

FIG. 1 illustrates an example process for distinguishing between RFID tags which are part of RFID-tagged packages on a forklift, and extraneous RFID tags within the read zone of a RFID reader located along the path of the forklift, and seeking to identify the tagged packages. At block 110, the forklift motion parameter input may comprise one, two or all of the scalar quantities velocity, acceleration, and the derivative of acceleration with respect to time (known as jerk), and/or one, two or all of the vector values of velocity, acceleration, or jerk. The forklift motion parameters may be obtained from a one-axis, two-axis or three-axis accelerometer on the forklift. More generally, the motion parameter input may represent predetermined or measured motion of RFID tags that are to be distinguished from extraneous tags.

The tag motion values may be obtained by tag readings taken at 120 using the time domain phase difference of arrival (TD-PDOA) method described e.g. in Section III of the incorporated technical paper "Phase Based Spatial Identification of UHF RFID Tags" by Nikitin, et al. It is useful to have phase measurements from several antennas simultaneously as described in reference to FIG. 9 in order to compute the tag vector parameters. Comparing forklift and tag velocity, acceleration, and jerk will allow one to conclude whether the tag is stray or not. This applies to scalar quantities of velocity, acceleration and jerk, as well as to the vector quantities.

At decision point 130, it is determined whether the tag read by the RFID reader has a calculated tag motion parameter, e.g. based on tag readings from a plurality of antennas, that matches the input forklift motion parameter defined at block 110. The forklift motion parameter input at block 110 may be determined in many ways. For example, the forklift may have an on-board motion sensor e.g. an accelerometer, and readings may be telemetered to the reader installation. Preferably the accelerometer readings are sent by a wireless link to the non-moving reader installation sufficiently frequently so that the variation of the accelerometer output as a function of time can be reconstructed at the reader installation with substantial accuracy. Alternatively, the non moving RFID reader installation may include a radiant energy speed sensor such as a radar type device positioned to monitor the travel of the forklift e.g. in a known direction during the process of FIG. 1. The process of FIG. 1 may be activated and deactivated by forklift position sensors (e.g. using photoelectric beams, pneumatic tubes or mechanical pressure actuated switches) that are triggered by the forklift as it approaches and travels through and beyond the reader installation read field. Based upon the readings from the tags per block 120, as the forklift traverses a path with respect to the RFID reader installation, e.g. changes in the phase may be determined e.g. as described in reference to FIG. 9, and utilized to determine apparent tag motion parameters for use in comparison step 130.

If at decision point 130, it is determined (block 130—Yes) that tag motion parameters match input forklift motion parameters, at block 140, the tag, and thus the package to which the tag is attached, is considered part of the forklift load. At block 160, the determination that the tag is considered part of the load is stored in a database for use e.g. in tracking tagged packages transported by the forklift.

If at decision point 130 it is determined (block 130—No) that the tag is not moving in correspondence with the motion parameters of the forklift load, at block 150, the tag and its corresponding package are not considered part of the forklift load. At block 160, the determination that the tag is not considered part of the load can be stored in a database for use by the RFID system The process continues in the same manner by returning to block 110, e.g. with an updated input of forklift motion parameters at block 110 for use in determining whether the next RFID tag is part of the load or not.

Description of FIGS. 2A, 2B and 2C

FIGS. 2A-2C illustrate the case where two forklifts 211 and 212 with loads 221 and 222 are moving parallel to each other, with similar velocities. FIG. 2B may be taken as illustrating substantially similar average velocities of the forklifts 211 and 212 relative to a non-moving antenna system 240, or may illustrate a zero average velocity relative to antenna systems 231 and 232 moving with the forklifts. While the velocity values v1 and v2 as a function of time shown in FIG. 2B are hard to distinguish, the acceleration values a1 and a2 as a function of time shown in FIG. 2C are easy to distinguish. Similarly the jerk values (represented at j1 and j2 in FIG. 2A) may be readily distinguished, e.g. as forklift 1 and forklift 2 move through adjacent portals.

Figure 5:
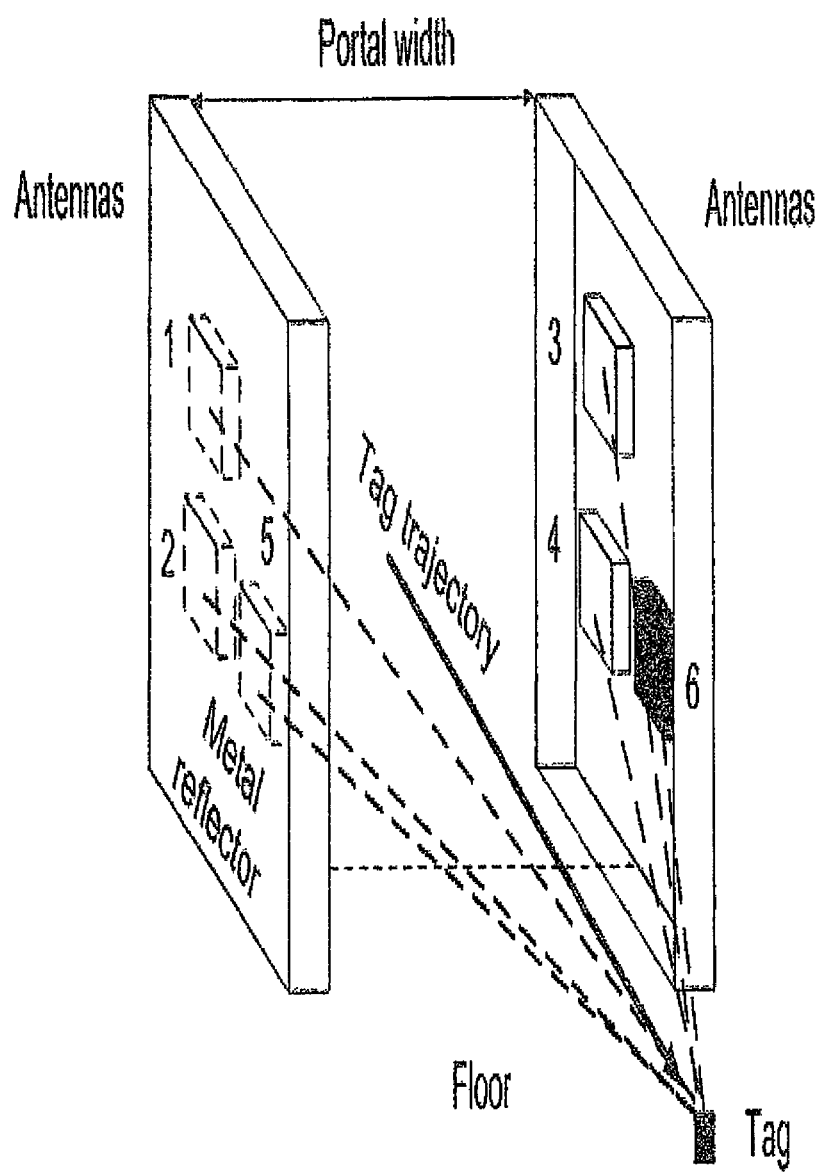
FIG. 5 is a diagrammatic showing of an exemplary antenna arrangement for obtaining motion parameters for tags moving through a portal.

FIGS. 2B and 2C thus illustrate that in the process of FIG. 1, it is advantageous to have a non-moving reader installation such as that associated with antenna system 240 or such as the portal reader installation of FIGS. 3 and 5, receive motion parameter information from the forklift load moving through the installation, from which the acceleration and or jerk of the tags in the forklift load can be determined. Thus in step 130 of FIG. 1, the tag acceleration and/or jerk based on tag readings from the antennas 345 of a portal reader installation can be compared with the corresponding acceleration and/or jerk values representing directly the motion of the forklift load based on measurements by the forklift motion sensor 325. Also for the case of an antenna system 445 moving with the forklift load as in FIG. 4, it is advantageous to compare at decision component 460 the acceleration and/or jerk values based on tag measurements with the corresponding values based on measured values for forklift load motion from forklift motion sensor 425 since extraneous tags that are not part of the load will exhibit distinctive values of acceleration and/or jerk even when the average velocities are similar.

Description of FIG. 3

FIG. 3 shows an example block diagram which may represent a portal RFID system 310 used to read one or more packages with RFID tags 315 carried by a transport vehicle such as a forklift 320. With RFID system 310 in FIG. 3, a forklift motion sensor 325 sends data via a wireless link to an input component 330 for processing. For the RFID system in FIG. 3, in one configuration the sensor 325 may comprise a three-axis accelerometer mounted on the backrest for the load; then a sufficiently sensitive sensor can detect motion of the fork moving up and down. In another configuration, the sensor 325 may comprise a two-axis accelerometer for sensing movement of the backrest and load in the horizontal plane. The RFID system 310 in FIG. 3 includes a calculator component 335, an RFID reader 340, and one or more RF antennas 345. The calculator component 335 calculates the tag motion values from the tag readings taken by the RFID reader 340 e.g. using the time domain phase difference of arrival (TD-PDOA) method described e.g. in Section III of the incorporated technical paper "Phase Based Spatial Identification of UHF RFID Tags" by Nikitin, et al. It is useful to have phase measurements from several antennas simultaneously as described in reference to FIG. 9 in order to compute the tag vector parameters.

One example according to FIG. 3 would involve the wireless transmission of the forklift motion information such as forklift tri-axial acceleration components from a tri-axial accelerometer to the input component 330 during the time that the forklift load is within the field of antennas 345. The input component 330 may compute scalar quantities for velocity, acceleration and/or jerk, and/or the vector values for velocity, acceleration and/or jerk, to be compared by means of decision component 360 with corresponding calculated tag values (e.g. of scalar velocity, acceleration and/or jerk, and/or the vector values for velocity, acceleration and/or jerk) obtained from the calculator component 335. Preferably the accelerometer readings are sent by a wireless link to the non-moving reader installation sufficiently frequently so that the variation of the accelerometer output as a function of time (and thus the movement of the forklift backrest, and of the tags in the load) can be reconstructed at the reader installation with substantial accuracy. Components 330, 335 and 360 may be part of the RFID reader system, or a part of a portal computer system connected with the RFID reader.

Description of FIG. 4

FIG. 4 shows an example block diagram which may represent a forklift RFID system 410 used to read RFID tags 415 associated with one or more packages carried by the forklift 410. A forklift motion sensor 425 sends data to an input component 430 for processing. As with the RFID system in FIG. 3, in one configuration the motion sensor 425 may comprise a three-axis accelerometer mounted on the backrest for the load; then a sufficiently sensitive sensor can detect motion of the fork moving up and down. In another configuration, the sensor 425 may comprise a two-axis accelerometer for sensing movement of the backrest and load in a horizontal plane. The RFID system 410 includes an RFID reader 440, and one or more RF antennas 445 which may be mounted on the forklift backrest for coupling with RFID tags 415 in the forklift load. A calculator component 435 may calculate the tag motion values from the tag readings taken by the RFID reader 440 e.g. using the time domain phase difference of arrival (TD-PDOA) method described in reference to FIG. 9. Since the RFID tags 415 on the forklift 410 would move with antennas 445, the relative velocity would be zero. Where values of tag motion based on readings from antennas 445 corresponded with forklift motion, the tag being read would be non-moving, and considered to be a stray. Where the decision component 460 considers e.g. tag velocity and tag acceleration and/or jerk, a tag on another forklift moving at similar speed could be distinguished based e.g. on its different acceleration and/or jerk. It is useful to have phase measurements from several antennas simultaneously as explained in reference to FIG. 9 in order to compute the tag vector parameters. Since the RFID tags 415 on the forklift 410 would move with antennas 445, the relative velocity would be zero. Where the decision component 460 considers e.g. vector motion parameters such as tag vector velocity tag vector acceleration, a tag on another forklift moving at similar speed could be distinguished based e.g. on its different direction of movement or its different vector acceleration.

One example according to FIG. 4 would involve the transmission of the backrest and load motion information such as tri-axial acceleration components from a tri-axial accelerometer to the input component 430 which would compute scalar quantities for velocity, acceleration and/or jerk, and/or the vector values for velocity, acceleration and/or jerk, to be compared by means of decision component 460 with corresponding calculated tag values (e.g. of scalar velocity, acceleration and/or jerk, and/or the vector values for velocity, acceleration and/or jerk) obtained from the calculator component 435. Components 430, 435 and 460 may be part of the RFID reader system, or a part of a forklift computer system connected with the RFID reader, for example.

Exemplary Operation of FIGS. 3 and 4

The system 310 of FIG. 3 may have provision for receiving a first signal at a suitable time before a forklift 320 is to come within the field of antennas 345. The timing of the first signal preferably should be such as to activate the reader 340 so as to provide the time needed to identify any RFID tags within its field that should be classified as strays prior to arrival of the forklift load at the field of antennas 345. For example, for a portal system at a loading and unloading dock, the system 310 may receive an alert signal from a cargo management subsystem such as shown in incorporated Published Patent Application US 2007/0213869 A1 as soon as a truck arrives which is to be unloaded via the portal system or as soon as an empty truck trailer is in position to be loaded via the portal system.

In one example, the tags identified as strays by the portal system may be silenced so as not to respond to the forklift reader 440 during traverses of the portal reader field by the forklift during the loading or unloading process. In this way, readers 340 and 440 are given more time to identify and evaluate tags that are likely to be part of the forklift load. In this connection, reference is made to the description of FIGS. 8A and 8B, e.g. subsection (7iii).

The system 310 may receive a second signal as each forklift load nears the portal field, and in response to this signal, the reader 340 takes tag readings to enable the decision component 360 to evaluate whether the tag motion matches the information on the actual motion of the forklift which is received at input component 330. After traverse of the portal field by the first forklift load, the portal system can receive a third signal that the forklift load has passed the portal field, and reader 340 can be operated to detect the presence of any further stray tags in its field. The second and third signals may be generated by forklift position sensors such as described with reference to FIG. 1.

During loading and unloading operations, the forklift antennas 445 may continually take readings from the on-board tags 415 (e.g. using a different session of the EPC Gen 2 protocol than the session used by the portal reader). As described in the incorporated published patent application US 2009/0207024 A1, the readings by reader 440 may be utilized to determine whether identified tags are within the limits of the load space and are true positive tags, or whether the tags exhibit motion relative to the antennas 445 and thus are stray tags.

Particularly where there are a large number of tags in each load, so that the portal reader cannot fully evaluate each tag in is field, it is advantageous to have tags identified by means of the forklift antennas as true positive tags, silenced prior to such true positive tags reaching the portal reader field, so as to not respond to the portal reader 340.

Instead of the portal system 310 silencing strays to prevent their responding to the forklift reader 440, the list of such strays can be sent by the portal system to the forklift system so that the forklift system can identify the listed tags as strays without requiring analysis of their location or relative velocity.

Instead of the forklift system 410 silencing true positive tags to prevent their responding to the portal system, the list of such true positive tags can be sent by the forklift system to the portal system so that the portal system can identify the listed tags as true positives without requiring analysis of their motion parameters or their location.

Figure 9:
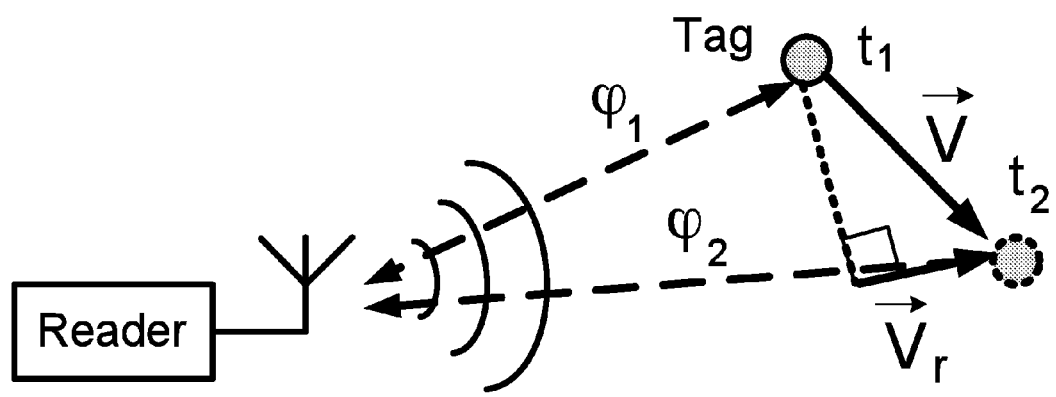
FIG. 9 is a diagrammatic view useful for explaining how tag three-dimensional motion vectors may be obtained, e.g. for use in the embodiments of FIGS. 1-5 and 8.

The forklift reader, e.g. 440, FIG. 4, may operate in a different session from the portal reader such as 340, FIG. 3, so that both readers can operate simultaneously With respect to the processing carried out by the calculator components 335 and 435, as has been previously pointed out with respect to read tag step 120, FIG. 1, the time domain phase difference of arrival (TD-PDOA) method explained e.g. in section III of the incorporated Nikitin et al technical paper of April 2010, may be used based on readings from several antennas as explained with reference to FIG. 9. The result obtained for a tag velocity vector can be differentiated with respect to time to obtain the acceleration vector, and the result for the acceleration vector can be differentiated with respect to time to obtain the jerk vector. The entire disclosure including specification, claims and drawings of Nikitin et al application Ser. No. 12/495,732 filed Feb. 13, 2009, now U.S. Pat. No. 8,248,210 is hereby incorporated herein by reference.

Description of FIG. 5

Referring to FIG. 5, a preferred way to determine the distance to the tag in the portal is to use frequency domain phase difference of arrival (FD-PDOA) technique (described in incorporated Nikitin et al April 2010 technical paper and in the incorporated patent application Ser. No. 12/495,732). By doing swept frequency measurements on all four portal antennas (whether they are mounted horizontally as with antennas 2,5 and 4,6, FIG. 5 or vertically as with antennas 1,2 and 3,4) and taking the phase derivative with respect to frequency, one can do four-angulation: find distances to the tag from each of the four portal antennas e.g. 1-4, FIG. 5, and hence calculate where the tag is. To better calculate the derivative, it is best to take measurements at all available frequency channels. This will increase the time spent reading each individual tag but will provide better ranging information. Also, multipath has an effect on the accuracy (as described in the Nikitin technical paper, Section IV, for the case of two antennas), but doing this on all four antennas, e.g. 1-4, FIG. 5, will allow to overcome some of the multipath problems. This method is analogous to FM-CW radar ranging with several different antennas.

Regarding the angle to the tag, in general a pair of vertically mounted antennas allows getting vertical bearing, while a pair of horizontally mounted antennas allows getting a horizontal bearing. This technique is referred to us as spacial domain phase difference of arrival (SD-PDOA). The best arrangement is when antennas are not too far away from each other and the reader is bistatic. However, monostatic reader and arbitrarily located antennas also work, just the geometry and calculations become more involved. In the portal setup of the thirteenth figure of the Nikitin et al April 2010 technical paper, the reader was monostatic, and the distance between the horizontal pairs of antennas was several feet (the width of the portal). Even that arrangement theoretically allows getting both horizontal and vertical bearings to the tag. By adding just one more antenna to each side of the portal (shown at 5,6 in FIG. 5), one could get a reasonable precision of getting the horizontal and vertical bearing to the tag. Antenna pairs 1,2, and 3,4 allow to calculate vertical bearing, and pairs 2,5 and 4,6 allow calculating horizontal bearing. As said before, one could use any pair from the set (say, pair 1-6, FIG. 5), but calculations become more involved. Pairs 1,3, 2,4, and 5,6 can also be used but because they are spaced more than a wavelength apart, there will be some ambiguity associated with the phase rollover. With proper calibration, a monostatic reader can be used to get the bearings to the tag.

Also, a very powerful method can be to combine SD-PDOA measurements and FD-PDOA: to do phase measurements on all channels and all antennas, and then apply both techniques and combine the results to find the most likely tag location.

Because TD-PDOA can measure only radial tag speed (relative to the antenna that measures it), it is useful to have such measurement done from several antennas to get the vector of the tag speed and see if this vector coincides with the vector speed of the forklift (obtained from the accelerometer based speed sensor on the forklift backrest)—i.e. not only to see that the tag in question moves at say seven miles per hour (7 mph) and the forklift moves at seven miles per hour (7 mph), but also to see that they move in the same direction. This would allow one to conclude with higher degree of credibility that the tag is on the forklift.

With the Gen2 RFID protocol, one can read 1000 tags per second on a single antenna at a single frequency, and with proper (fast) antenna switching, one can measure angle to the tag in a fraction of a second. Similarly, to get the range to the tag (FD-PDOA technique), one needs to do a few frequencies, but even if 50 frequencies are used, we still are talking about 20 tags per second, ½₀ second per tag.

The disadvantage of the bistatic reader is the large number of antennas required (e.g. four on each side with three receive antennas, e.g. two, three, four, on each side as in figure sixty-two of incorporated application Ser. No. 12/765,865 filed Apr. 23, 2010, hereafter incorporated figure sixty-two) and the need for a bistatic reader.

The setup shown in the thirteenth figure in the incorporated paper by Nikitin et al, April 2010 may be a standard portal setup, which is a big advantage. Such or a similar portal is used by many warehouse companies and requires only a monostatic reader. See Nikitin et al incorporated patent application "Method and System to Determine the Orientation, Size, Position, and Movement of RFID Tagged Objects", U.S. patent application Ser. No. 12/495,732, for an explanation of preferred modes of operation of the antenna system of the incorporated figure thirteen.

Re FIG. 5 and incorporated figure sixty-two, if one wants to get a horizontal and vertical bearings to the tag, there can be on each side:

1 Tx, 3 Rx antennas (e.g. incorporated figure sixty-two—assumes a bistatic reader), or 1 Tx/Rx, 2 Rx antennas (e.g. FIG. 5—if a bistatic reader is used), or 3 Tx/Rx antennas (e.g. FIG. 5—if a monostatic reader is used).

In general, monostatic readers are simpler, cheaper, and prevailing on the RFID market. However, the calibration of phase needs to be done more carefully, because if two antennas are used in Tx/Rx mode each, not only the return path from the tag to the reader antennas is different (and contributes to the phase difference), but also the forward paths are different. As a result, the tag may receive different amounts of power from different antennas and hence have additional phase offsets.

Figure 6:
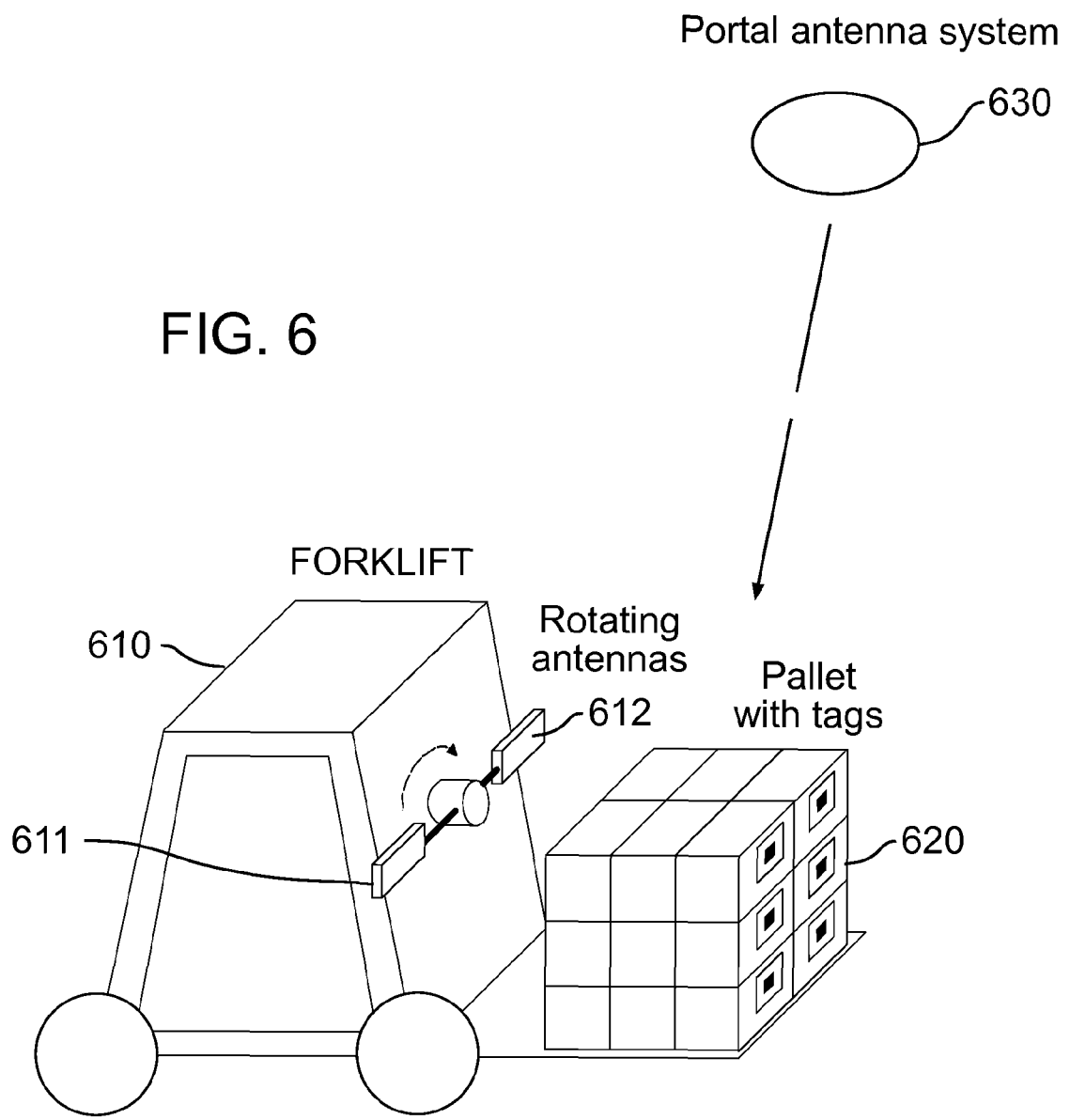
FIG. 6 shows a mechanical embodiment for continuously changing the antenna pattern of the reader antennas e.g. while the antennas move with a forklift truck.
Figure 7:
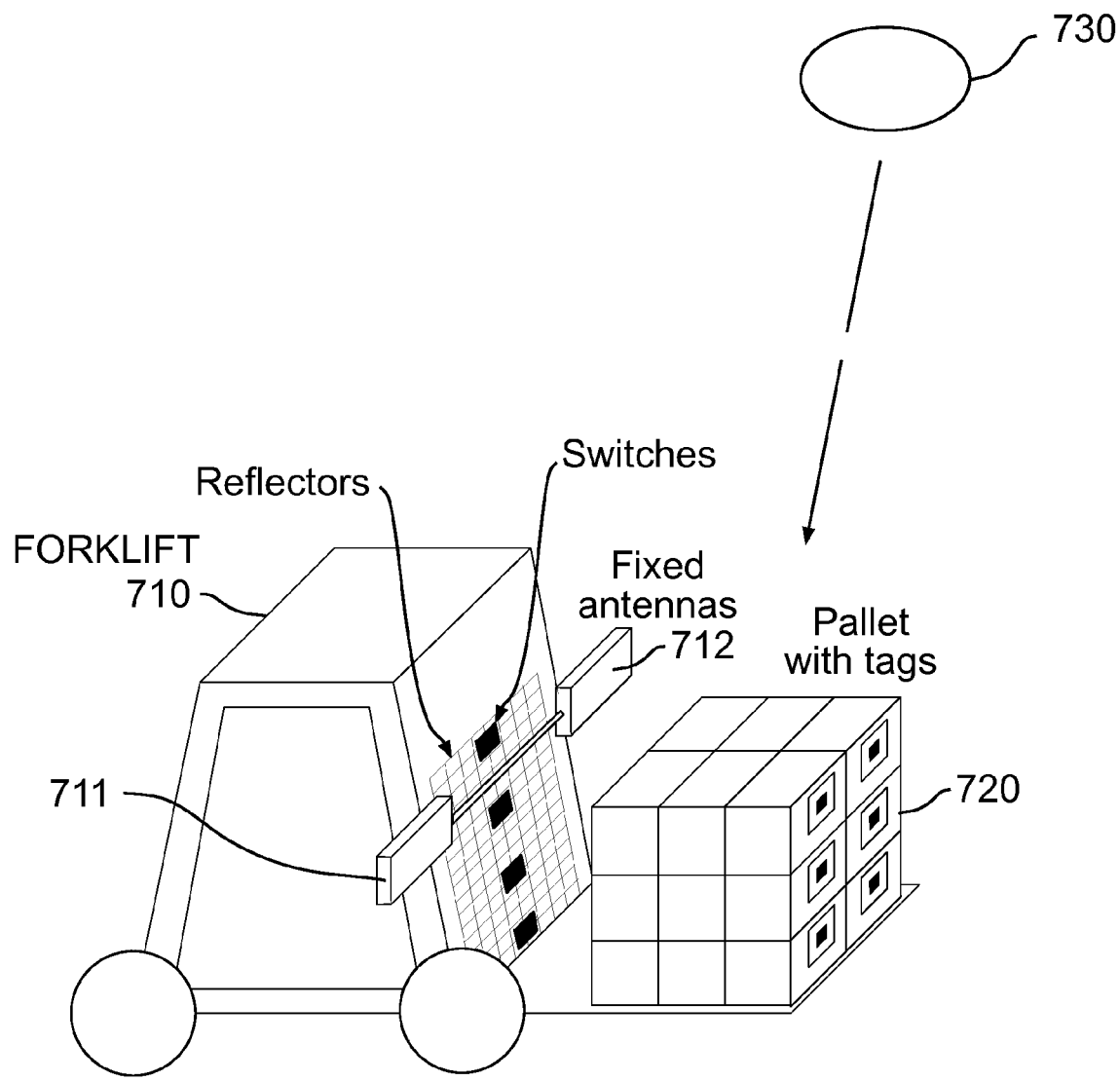
FIG. 7 shows an electronic embodiment for continuously changing the antenna radiation pattern as seen by the tags on the pallet, with non-rotating "fixed" reader antennas, e.g. which may be moving with the forklift vehicle.

Description of FIGS. 6 and 7

Necessity to deliver enough RF power to passive RFID tags is the main factor that influences the ability to read all tags on a pallet carried by RFID equipped forklift. Because of the challenging RF environment and various possible tag antenna patterns, multiple antennas are usually mounted on the forklift. A typical number is two. See e.g. incorporated US 2007/0213869 A1. Even with two antennas, it is hard to achieve 100% identification rate for tags on a pallet. Antenna patterns, whether it is a tag antenna or a reader antenna, are complicated and greatly affected by RF environment. Some tags can be read from one direction, some from another. Moving a reader antenna by a few inches or bringing a reflecting object nearby can cause additional reads.

In order to increase true positive reads for tags in a load as diagrammatically indicated at 620 or 720 on a forklift as indicated at 610 or 710, it is proposed to continuously change the antenna pattern of the reader antennas (with respect to each individual tag antenna) while reading. This can be done mechanically or electronically. An example of a mechanical implementation is rotating a pair of reader antennas 611 and 612 as shown in FIG. 6. In an electronic example, a few reflectors (which can be made of solid metal or from a metal mesh, with cell size less than half a wavelength) can be placed near non-rotating reader antennas 711 and 712 and connected to each other using switches (e.g. PIN diodes), as shown in FIG. 7. Activating or deactivating those switches will short/open the reflector connections, delivering the result of a successive shifting of the radiation pattern of reader antennas as seen by the tags on the pallet. The reflectors can also be placed underneath the pallet or on the sides.

The arrangements of FIGS. 6 and 7 can also be used for portal antennas to continuously change the antenna pattern in the path of a forklift load of tagged items through a portal.

By way of example, in FIG. 6, forklift 610 has a rotary encoder rotating with the antennas 611 and 612 which may encode successive discrete angular positions where a reading operation takes place. The pairs of readings taken at each successive angular position are then processed as separate antenna readings. In FIG. 7, the successive antenna radiation patterns may be assigned successive code numbers, and the readings taken for each antenna radiation pattern are then processed as separate antenna readings. In FIGS. 6 and 7 with non moving antenna systems 630, 730 present, the forklift antennas may radiate non reading exciting fields as taught in the incorporated Nikitin et al. Published Patent Application US 2008/0111688.

The antenna systems of FIGS. 6 and 7 may be used as the forklift antenna system and/or the portal antenna system described with reference to FIGS. 2A, 2B and 2C, and may be used for antennas 345, FIG. 3, 445, FIG. 4, and in place of antennas 1-6 in FIG. 5. The antenna systems of FIGS. 6 and 7 may also be used for the embodiments disclosed in the incorporated published patent application US 2009/0207024 A1.

Figure 8A:
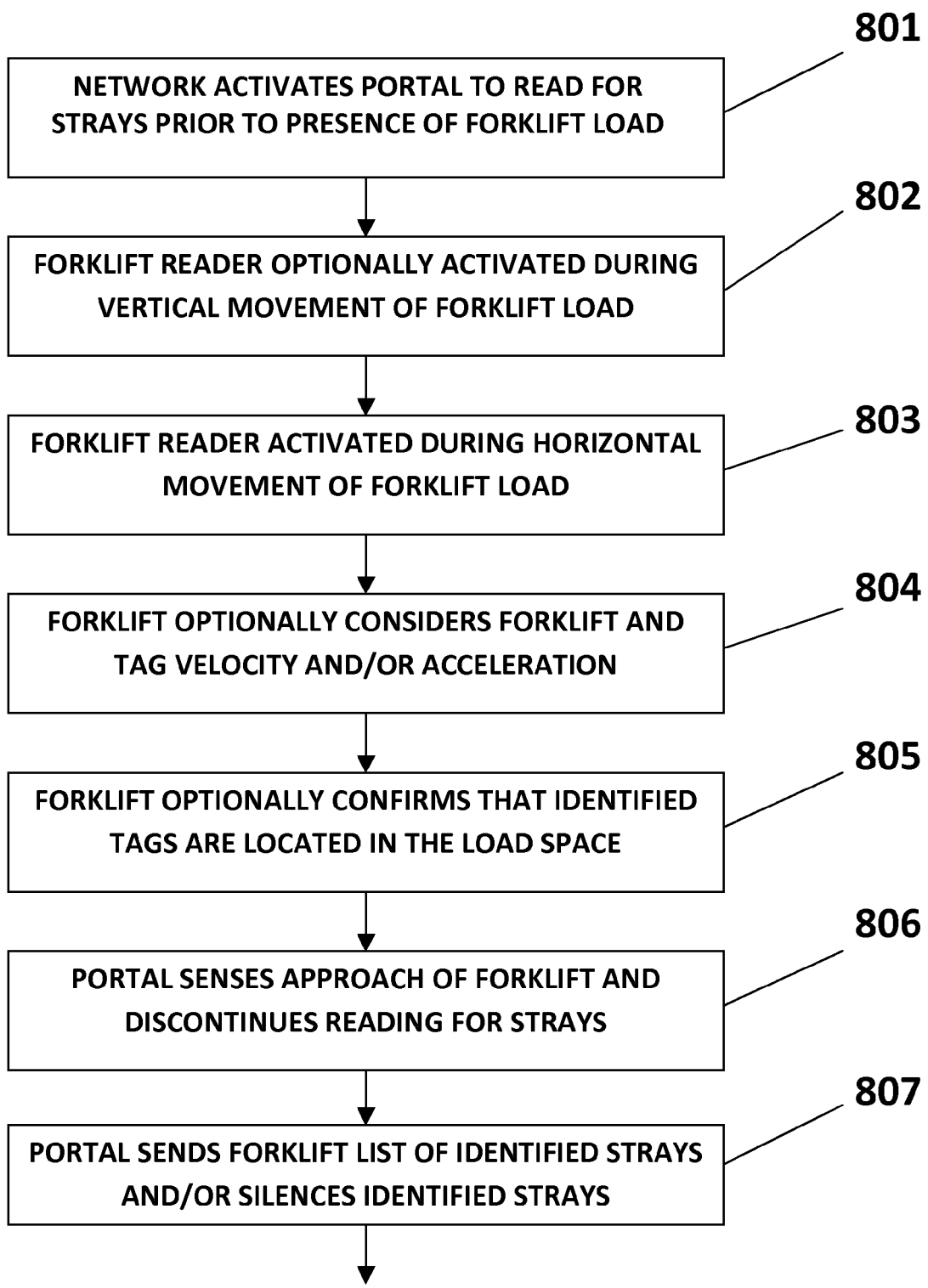
FIGS. 8A and 8B show an exemplary sequence of processing steps for identifying tags that are part of the forklift load e.g. as the load moves from a staging area past a portal reader system and is loaded onto a transport vehicle.
Figure 8B:
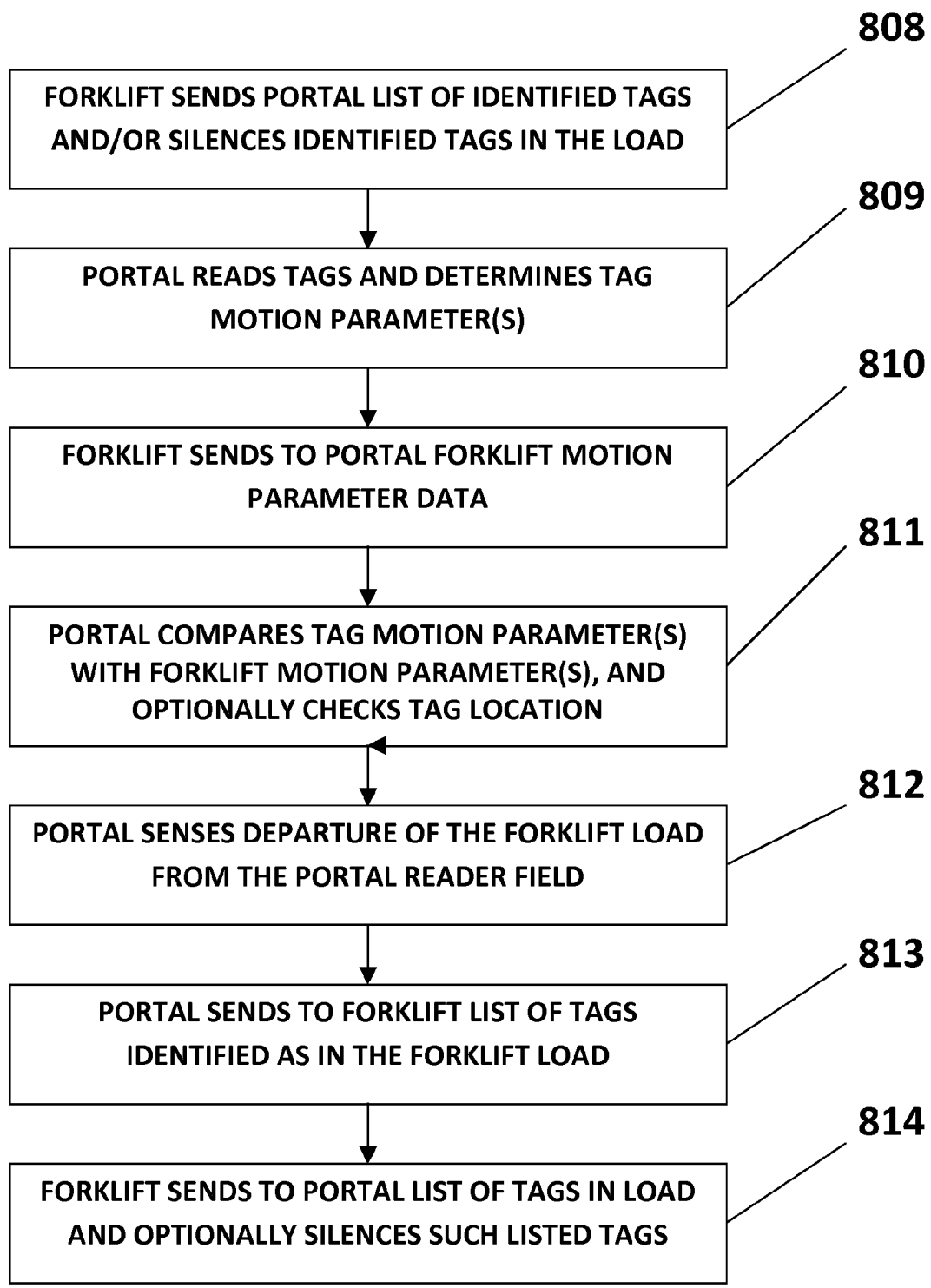

Description of FIGS. 8A and 8B

(1) Portal Reader Reads Stray Tags Prior to the Arrival of the Forklift Load, Step 801

In a preferred arrangement, a cargo management subsystem (such as 108 in incorporated US 2007/0213869) would activate the portal reader, e.g. 340, FIG. 3, as soon as feasible prior to the time that a forklift with given ID would arrive in the vicinity of the portal. This would activate the portal reader to read stray tags prior to the forklift load coming into the portal reader field.

(2), (3) In a Preferred Mode of Operation, the Forklift Reader is Active During Vertical Movement of the Forklift Load, Step 802, FIG. 8A, as Well as During Horizontal Movement Per Step 803.

In one example, the reader 440 may be activated as a pallet of tags is raised vertically by the forks of the forklift. An advantage is that a vertical component of motion is generally more distinctive, since adjacent tags tend to be stationary or only moving horizontally. Thus vertically moving tags with a zero vertical component of velocity relative to the antennas 445, are likely to be tags which are part of the forklift load.

As an extension, as the forklift moves through the portal, it may stop at one point, and have all tags on the forklift (whole load) moved up and down (or forward/backward) by a certain distance (e.g. 1.0 foot) N times during a given time interval T. The forklift can do that by driving back/forth, or lifting/lowering the load. The reader then looks for the tags whose phase and RSSI fluctuate periodically with frequency N/T. This would help to identify which tags are the tags of interest. Tags in the load may be moved in one direction for one half wavelength to get the phase calibration.

(4) The Forklift, e.g. Of FIG. 4, Preferably Considers Forklift and Tag Velocity, and May Also Compare Forklift and Tag Acceleration and/or Jerk Per Step 804

Where the antenna system moves with the load, it is advantageous to obtain quantitative velocity values for forklift velocity and for tag velocity based on tag readings. For example, the tags in the load should have zero quantitative velocity value relative to the antenna system, so that tags found to have quantitative velocity values somewhat above zero, could be regarded as questionable as to true positive status; such tags of questionable status could be further evaluated e.g. by repeating the calculation of quantitative velocity based on further tag readings by the forklift antenna system.

In a robotic system, for example, the velocity of forklifts in adjacent portals may be selected so as to be different, so that moving tags in adjacent portals can be identified by their velocity values relative to the forklift antennas. Other moving tags can be expected to have different directions of their velocity vectors.

The advantage of considering tag acceleration and/or jerk has been explained with reference to FIGS. 2A, 2B and 2C.

(5) The Forklift Reader System May Confirm that Identified Tags are Located in the Load Space Per Step 805

Reference is made to the first figure of incorporated published application US 2009/0207024 A1 (e.g. decision block 130, paragraph [0024]), and the incorporated Nikitin et al patent application Ser. No. 12/495,732 filed Feb. 13, 2009.

(6) The Portal Senses the Approach of the Forklift and Discontinues Reading for Strays Per Step 806

An active RFID tag or a battery powered passive tag mounted on the forklift could be used to signal that a specific forklift is approaching the portal reader field. When the portal reader is activated by the cargo management subsystem, the portal reader can periodically send interrogation signals addressed to the active or battery powered RFID tag on the approaching forklift, so that as soon as the RFID tag is in the field of the portal reader, the portal reader will receive a response from the RFID tag and discontinue evaluating for stray tags in the portal field region. The range of the active or battery powered tag exceeds that of an ordinary passive tag, so passive tags in the forklift load will not be sensed by the portal reader at the time that the active or battery powered tag responds to the portal reader.

(7) The Portal Sends to the Forklift a List of Identified Stray Tags and/or Silences the Identified Strays Per Step 807'

(7i) Portal Sends List of Identified Strays to the Forklift Reader System

Each time the forklift approaches the portal, the portal system may send to the forklift reader system computer e.g. via the cargo management subsystem, a list of stationary stray tags so that such stray tags if identified by the forklift reader, would not need to be evaluated by the forklift reader system (e.g. by computing their velocity or location relative to the forklift antennas).

(7ii) Portal Silences Identified Strays—Forklift and Portal Readers Operating in the Same Session e.g. Session Two.

Ideally the portal reader system would measure the range to identified stationary stray tags, and silence stationary stray tags within a selected perimeter about the portal reader installation for a selected time, e.g. at least for the persistence time of two seconds of a session two persistence flag S2, so that such stray tags would not be read by the forklift reader (operating in session two) as it approached the portal reader field. When the forklift reader system was almost within the portal reader field, the forklift reader could cease reading for further tags, and switch to non reading exciting mode as taught by the incorporated Nikitin et al. Published Patent Application US 2008/0111688, so as to assist the identification of further tags in the load by the portal reader system.

(7iii)) Portal Silences Identified Strays—Forklift Reader System Operating e.g. in Session Two, and Portal Reader System Operating in Session Three.

If the forklift reader is operating on a different session than the portal reader (so that both could operate simultaneously), the portal reader after identifying and silencing stray tags, might switch from session three to session two and silence the stationary stray tags within the selected perimeter, so that such stray tags would be held silenced for both session two and session three reading fields when present. Specifically as long as the field of the forklift reader maintained a stray tag activated, such stray tag would not be read by the forklift reader system as it traversed the portal reader field.

(8) The Forklift Sends to the Portal System a List of Tags Identified as being in the Forklift Load, and/or Silences Such Identified Tags For example, when the forklift system receives the list of stationary strays per Step 807, the forklift system may send to the portal system a list of tags in the load so that the portal system does not need to spend time evaluating already identified tags (e.g. evaluating the motion of such tags and their path of movement). Ideally, the tags identified by the forklift system as part of the load would be silenced prior to arrival of the forklift load at the portal field, so that the portal system would not have to deal with such already identified tags. One method for silencing tags is to define bits in memory on the tag that indicate that the tag has been read and identified by the forklift reader system as being part of the load.

(9), (10) and (11) The Portal Reader System Obtains the Tag and Forklift Motion Parameters as the Forklift Load Traverses the Portal Reader Field Per Steps 809 and 810, and Compares Such Parameters Per Step 811, and May Also Check that Identified Tags are within the Path of the Forklift Load Per Step 811

Where the speed of the forklift and thus the speed of the tags in the load can be preset to a specific quantitative value, or measured to obtain specific quantitative velocity values relative to the stationary reader reading them, then more certainty can be given to a comparison with the calculated speed as derived by the stationary reader from the phase difference of arrival information. For example if the speed of the forklift is known by the portal to be 1.0 mile per hour and the multiple phase measurements by the portal reader of the tag also produce a computed speed of 1.0 mile per hour, then it is known with more certainty that the tag is indeed a true positive moving through the portal.

A microprocessor in the forklift computer could have the capability of sampling the forklift accelerometer output at a much higher rate than could be transmitted to the portal reader system (which is limited by the RF air protocol). The forklift processor and the portal computer could have synchronized real time clocks so that the batch accelerometer data sent to the portal reader system e.g. via the cargo management subsystem could be correlated with tag motion parameters as computed at the portal (based on tag readings by the portal reader).

Exemplary processing at the portal reader system has been discussed in relation to FIGS. 2A, 2B and 2C, and FIG. 3, and in the Exemplary Operation of FIGS. 3 and 4. Checking that identified tags are within the path of the forklift load can utilize triangulation as described in the incorporated published patent application US 2009/0207024 A1 at paragraph [0024]. With a one-axis forklift accelerometer, the forward motion of the forklift along the straight path through the portal would be represented as the acceleration of the forklift load in the forward direction. With a second, or a second and third, accelerometer axis, the vertical motion of the forklift load could be included in the resultant load acceleration vector. The load velocity vector would be obtained as the time integral of the load acceleration vector. Where the velocity of the forklift is measured by a speed gauge associated with the portal, the load velocity vector would be obtained directly, and the time derivatives would give the acceleration and jerk vectors for the load.

(12) The Portal Senses the Departure of the Forklift Load from the Portal Reader Field Any suitable sensor may be used to determine when the portal reader should discontinue reading for tags in the forklift load, e.g. a photoelectric ("electric eye") system, or a pneumatic tube or a mechanical treadle actuated by the weight of the forklift. It is useful to discontinue operation of the portal reader when the forklift load is out of range of the portal field, since reflection of the portal field by the forklift may only serve to cause the reading of stray tags not otherwise within the portal field.

(13) The Portal Sends to the Forklift System a List of the Tags Identified as being in the Forklift Load As the forklift load leaves the portal reader field, the portal reader may send to the forklift the portal list of true positive tags to confirm forklift-identified true positive tags, or to reduce tag processing time by the forklift. In some situations, the portal reader system may send to the forklift e.g. via the cargo management subsystem a list of true positive tags that the portal reader system had confirmed were moving according to the forklift motion parameters, and were located at the path of the forklift load through the portal field, e.g. so that the forklift reader would not need to evaluate any such true positive tags (during forklift movement beyond the portal reader field).

(14) The Forklift System Sends to the Portal a List of Tags in the Load and/or May Silence the Tags Found to be in the Load In some situations, the forklift reader system could send its list of true positive tags to the portal system via the cargo management subsystem, e.g. so that a later reading by the portal reader of an already loaded tag could be recognized as being such and thus being spurious. Tags identified as true positive tags and deposited in the trailer could be silenced for the remaining duration of the loading operation, e.g. so as not to be readable by the forklift reader or the portal reader. Once a tag has been placed in the truck for instance, then a bit could be set on the tag by the forklift reader indicating that the tag already was on the trailer. The portal reader and the forklift reader would then only read tags which didn't have that bit set. The portal reader and the forklift reader would not waste time re-identifying tags that are not of interest since they have already been processed.

In an ideal situation, where the total number of tags in each forklift load is known, vertical movement of the load at deposit e.g. in a truck trailer might serve to locate any missing tags. If not, a special reading booth or a special forklift might be used e.g. equipped with rotary antenna systems such as shown in FIGS. 6 and 7, either on a forklift as shown or at a stationary location. The incorporated Nikitin et al published patent application US 2008/0111688 A1 shows antennas (such as 306) above the RFID tag. Such an antenna or antennas could be located on a forklift above the forklift load region, or e.g. at the sides of the forklift load region, or in the ceiling e.g. over the staging area where the forklift load is moved vertically, or over the path of the forklift through the portal, to insure that all tags in a load are adequately activated. Plural portal systems along the path of a load, e.g. with a separation of at least eight feet, might be utilized. Such separated portal systems might have different configurations of antennas, e.g. one like FIG. 5, and one with overhead antenna.

Description of FIG. 9

FIG. 9 illustrates the time domain phase difference of arrival (TD-PDOA) technique and corresponds with the fourth figure of the incorporated Nikitin et al technical paper of April 2010. By measuring the phase of the tag signal at two different time moments $t_1$ and $t_2$ (with a fixed frequency), the tag radial velocity vector V, can be calculated as explained in the incorporated Nikitin et al technical paper. With the use of three antennas, one used for transmit and receive, three tag radial velocity vector components of the tag three-dimensional velocity vector V are obtained from which the tag three-dimensional velocity vector V can be calculated. The derivative with respect to time of the tag three-dimensional velocity vector V will give the tag three-dimensional acceleration vector, and the derivative with respect to time of the tag three-dimensional acceleration vector will give the tag three-dimensional jerk vector.

In another way of determining tag three-dimensional velocity vector, tag location at points $t_1$ and $t_2$ in FIG. 9 can be determined, e.g. with coordinates x1, y1, z1 and x2, y2, z2 using frequency domain phase difference of arrival (FD-PDOA) or spacial domain phase difference of arrival (SD-PDOA), with three antennas, one used for transmit and receive. The expression for the tag three-dimensional velocity vector is:

$$[Vx, Vy, Vz] = [(x2-x1)/(t2-t1), (y2-y1)/(t2-t1), (z2-z1)/(t2-t1)].$$

The TD-PDOA approach is preferred because it requires less processing and is less prone to errors—the radial velocity vectors are obtained directly from the phase derivatives. In both the TD-PDOA technique and the FD-PDOA and SD-PDOA techniques, the three antennas must be spatially separated and must not lie on the same line. Examples of such antenna configurations are figure seven A of the incorporated Nikitin et al patent application Ser. No. 12/495,732 and FIG. 5 herein. Forklift backrests may have three or more antennas for carrying out the TD-PDOA, FD-PDOA and SD-PDOA approaches explained above; for example the load backrest of the fifth figure of incorporated published application 2007/0213869 A1 has four antenna placement zones. The forklift and portal arrangements of FIGS. 6 and 7 may have three or more antennas for carrying out the TD-PDOA, FD-PDOA and SD-PDOA approaches explained above, for example three antennas at equal 120 degree intervals.

Spatial identification technology (SID) may be used to define a space in front of a forklift as a "load space," where the load space may be either a certain volume or area in front of the forklift. Packages within that volume or area in front of the forklift are considered on the load, while packages outside of that area are considered not on the load. SID may also be used to detect when a tagged item is in motion and a tagged item's location relative to the reader antenna. SID may include, but is not limited to, traditional motion sensors using infrared light or laser technology, vibration sensors, gyroscopes, and accelerometers. SID may be built into an RFID reader system or alternatively be a separate system or sensor (e.g., be built within a vehicle).

The following documents discuss SID in greater detail and are incorporated by reference: (1) U.S. Pat. No. 6,600,443, entitled, "Method and Apparatus to Determine the Direction to a Transponder in a Modulated Backscatter Communication System", filed Oct. 18, 2002; (2) U.S. Pat. No. 6,476,756, entitled, "Method and Apparatus to Determine the Direction to a Transponder in a Modulated Backscatter Communication System", filed Jun. 4, 2001; (3) PCT Publication No. WO 2007/035833, entitled, "Method, Apparatus, and System for Selecting and Locating Objects Having Radio Frequency Identification (RFID) Tags; (4) "Phase Based Spatial Identification of UHF RFID Tags" by Nikitin, Martinez, Ramamurthy, Leland, Spiess, and Rao, presented at the IEEE RFID Conference at Orlando, Fla., Apr. 14-16, 2010 (Available to the public via IEEEXplore—identifier code 978-1-4244-5744-1/10/$26, copyright 2010 IEEE); and (5) "Method and System to Determine the Orientation, Size, Position, and Movement of RFID Tagged Objects", U.S. patent application Ser. No. 12/495,732 filed Feb. 13, 2009.

Description of FIGS. 10-14

FIG. 10 illustrates a system 1010 in a warehouse or the like for assembling RFID tagged items into a load. In FIG. 10, a pallet is indicated at 1020 for transporting a load of tagged items to a remote site. The pallet may have a receptacle 1030 for receiving tagged items such as 1052 as represented by dash line 1035. One tagged item or a group of tagged items constituting a subset 1050 of the complete set of tagged items to be placed on the pallet, is moved through the reading field of a tag reading system 1060 by means of a robotic system 1070. The robotic system engages a subset of one tagged item or a plurality of tagged items as represented by dash line 1072, and moves such subset in the reading field of system 1060, e.g. with a known characteristic movement pattern and/or e.g. at a known motional rate, that is essentially distinctive in comparison to stray tags within the reading field, so that such stray tags can be distinguished from the true tags of interest. The tags in the receptacle 1030 may be subjected to an exciting field 1067 from an exciting field source 1065 which serves to maintain the inventory flags of the identified tags powered so that the tags in receptacle 1030 remain quiet and do not burden the reading of further tags as they are added to the load Such exciting fields have been disclosed in the incorporated Nikitin Published Patent Application US 2008/0111688, but only for use to enhance the range of a reading field which is also present.

The tag reading system 1060 may have a radio frequency interface 1080 with an antenna for communicating via link 1075 with the robotic system 1070 and for communicating via a link 1077 with a supervisory system 1090, for example. The supervisory system 1090 may have a communication link 1095 with the robotic system 1070. The robotic system may have a vision system for transmitting a view of the robotic system work area e.g. to the supervisory system 1090 via communication link 1095. The robotic system may execute human voice commands e.g. from the supervisory system 1090, and may acknowledge such commands and confirm execution of the commands utilizing human language communication via link 1095. The supervisory system may for example select the motion of a true tag 1052 or of a plurality of true tags of subset 1050 to be effected by the robotic system, and may instruct the reading system 1060 to evaluate its tag readings so as to compare the robotically introduced motion with that exhibited by the tag readings of the tag reading system. The number of tags in subset 1050 may be known in advance, so that if the number of tags, identified as true for a given subset by the reading system does not agree with the known number of tags in the subset, the supervisory system for example may instruct the robotic system not to deliver the subset to the container 1030, but to move the subset in the reading field with a different motional pattern or different motional rate. The systems 1060, 1070 and 1090 may be adaptive so that a motional pattern or motional rate that is successful, is adopted for further use until otherwise indicated.

In one example, an individual tagged item 1052 is moved through the reading field of the reading system 1060 by the robotic system 1070. In this example, each tagged item after it has been individually identified is individually assembled in container 1030. For this case, the robotic system 1070 may be programmed e.g. with an internal supervisory system to pick up one tagged item at a time, e.g. from carrier 1056, so that if stray tags are properly excluded, there will be only one tag identified as being assembled in the load. If two tags are identified, it will be known that one is extraneous, and the robotic system may again move the tagged item through the reading field, e.g. with a different movement pattern or motion rate, until only one tag is identified as having the matching motional data. Where the robotic system has an internal supervisory system, the communication link 1075 between the reading system 1060 and the robotic system 1070 may be used for assuring that when the number of identified tags does not match the number of items moved by the robotic system, the item will be read again to obtain conformity between the number of tags identified and the number moved by the robotic system.

In a different example, the robotic system 1070 may move the carrier 1056 and the tagged items thereon through the reading field of the reading system 1060 for concurrent identification. In this example, the carrier 1056 may be in the form of a tray of suitable radio frequency permeable material such as plastic or the like. For example, six tagged items 1052 are shown mounted as a subset 1050 on carrier 1056, but the number may be substantially greater, or may be less—e.g. one. The number of items on the carrier 1056 is preferably known or counted by the robotic system so that the reading system 1060 can abort a loading of the subset of tagged items into the container 1030 if an incorrect number of tags has been identified. The robotic system can then again move the subset of tagged items through the reading field e.g., with a different motional pattern or a different motional rate value, e.g. in accordance with programming of an internal supervisory system of the robotic system or of the reading system. The number of tagged items 1052 and their arrangement on the carrier 1056 are such that each RFID tagged item receives an adequate amount of the reading field so as to be reliably readable. In the case of a fully assembled load, it is possible that tagged items may obstruct the reading of other items in the load. With the use of a subset of tagged items, the number of items may be limited to a known quantity and the items may be arranged in a configuration so as to all be reliably readable.

The subset 1050 of one or more tagged items is scanned, for example, by moving the subset in the reading field of the reading system 1060 with a motional pattern and/or a motional rate as directed by the supervisory system. The supervisory system may be external as shown at 1090, or internal to the reading system 1060 or the robotic system 1070. For example, the robotic system 1070 in accordance with instructions from the supervisory system, may move the tagged item or items according to a motional parameter, e.g. in a characteristic motional pattern and/or at a given motional rate value, (e.g. at a given velocity, acceleration or jerk), in the reading field of the system 60, so that extraneous tags can be excluded as explained with reference to FIGS. 1-5 and 9. By comparing tag readings which identify motional rate value and/or motional pattern, with known motional parameters for the tagged items of interest, it is possible to distinguish stray tags that are not moving with the known motional rate value and/or motional pattern. The time that the tagged item or items is exposed to the reading field may be selected by the supervisory system so that each tag of the subset 1050 receives sufficient tag readings to insure that its motional parameter is reliably measured. The robotic system 1070 may have a communication system for receiving instructions by human voice e.g. so as to execute the instructions mentioned herein e.g. from the supervisory system 1090. The robotic system 1070 may also have a communication system for responding using human speech, e.g. to acknowledge instructions.

FIG. 11 illustrates the case where one or more of the tagged items 1052 comprising the subset 1050 are moved in the reading field along a horizontal linear path 1101 by the robotic system 1070. The movement of the tagged item or items of the subset may be with a unique motional pattern not present in the reading field environment, and/or with a known scalar or vector value of velocity, acceleration, or jerk, for example, so that stray tags that do not have the movement of the subset 1050 can be excluded. The reading field may be generally normal to the plane of the support surface of the carrier 1056 when the carrier 1056 is present, and the RFID tags of the tagged items of the subset are arranged so as to be adequately exposed to the reading field without being blocked by other of the RFID tagged items of the subset.

FIG. 12 illustrates the case where one or more of the tagged items 1052 comprising the subset 1050 are moved in the reading field along an arcuate path, e.g. a circular path 1201, by the robotic system 1070. The movement of the tagged item or items of the subset may be with a unique motional pattern, or a known scalar or vector value of velocity, acceleration, or jerk, for example, not present in the reading field environment, so that stray tags that do not have the movement of the subset 1050 can be excluded. The reading field may be generally normal to the plane of the circular path 1201 and to the support surface of the carrier 1056 when present, and the RFID tags of the tagged items of the subset are arranged so as to be adequately exposed to the reading field without being blocked by other of the RFID tagged items of the subset.

FIG. 13 illustrates the case where one or more of the tagged items 1052 comprising the subset 1050 are moved in the reading field along a linear path 1301 in a first horizontal direction, and then along a linear path 1302 in an opposite horizontal direction by the robotic system 1070. The movement of the tagged item or items of the subset may be with a known scalar or vector value of velocity, acceleration, or jerk, for example, so that stray tags that do not have the movement of the subset 1050 can be excluded. The reading field may be generally normal to the plane of the support surface of the carrier 1056 when present, and the RFID tags of the tagged items of the subset are arranged so as to be adequately exposed to the reading field without being blocked by other of the RFID tagged items of the subset.

FIG. 14 illustrates the case where one or more of the tagged items 1052 comprising the subset 1050 are moved in the reading field along a vertical path 1401 by the robotic system 1070. The movement of the tagged item or items comprising the subset may be with a known scalar or vector value of velocity, acceleration or jerk, for example, so that stray tags that do not have the movement of the subset 1050 can be excluded. The reading field may be generally normal to the plane of the support surface of the carrier 1056 when present, and the RFID tags of the tagged items of the subset are arranged so as to be adequately exposed to the reading field without being blocked by other of the RFID tagged items of the subset.

In each of the embodiments of FIGS. 11 and 13, the reading field may be generated by an arrangement such as indicated in FIG. 5 with one set of antennas 1, 2, 5 in a plane above and parallel to the plane of the carrier 1056 when present and with the second set of antennas 3, 4 and 6 located in a plane below and parallel to the plane of the carrier 1056 when present. In FIG. 12, the reading field may be generated by an arrangement such as indicated in FIG. 5 with one set of antennas 1, 2, 5 in a plane above and parallel to the plane of the carrier 1056 when present, and above and parallel to the plane of the circular path 1201, with the second set of antennas 3, 4 and 6 located in a plane below and parallel to the plane of the carrier 1056 when present and below and parallel to the plane of the circular path. For FIG. 14, the reading field may be generated by an arrangement such as indicated in FIG. 5 with one set of antennas 1, 2, 5 in a plane above and parallel to the plane of the carrier 1056 when present, and above the vertical path 1401, and with the second set of antennas 3, 4 and 6 located in a plane below and parallel to the plane of the carrier 1056 when present and below the vertical path 1401.

Figure 15:
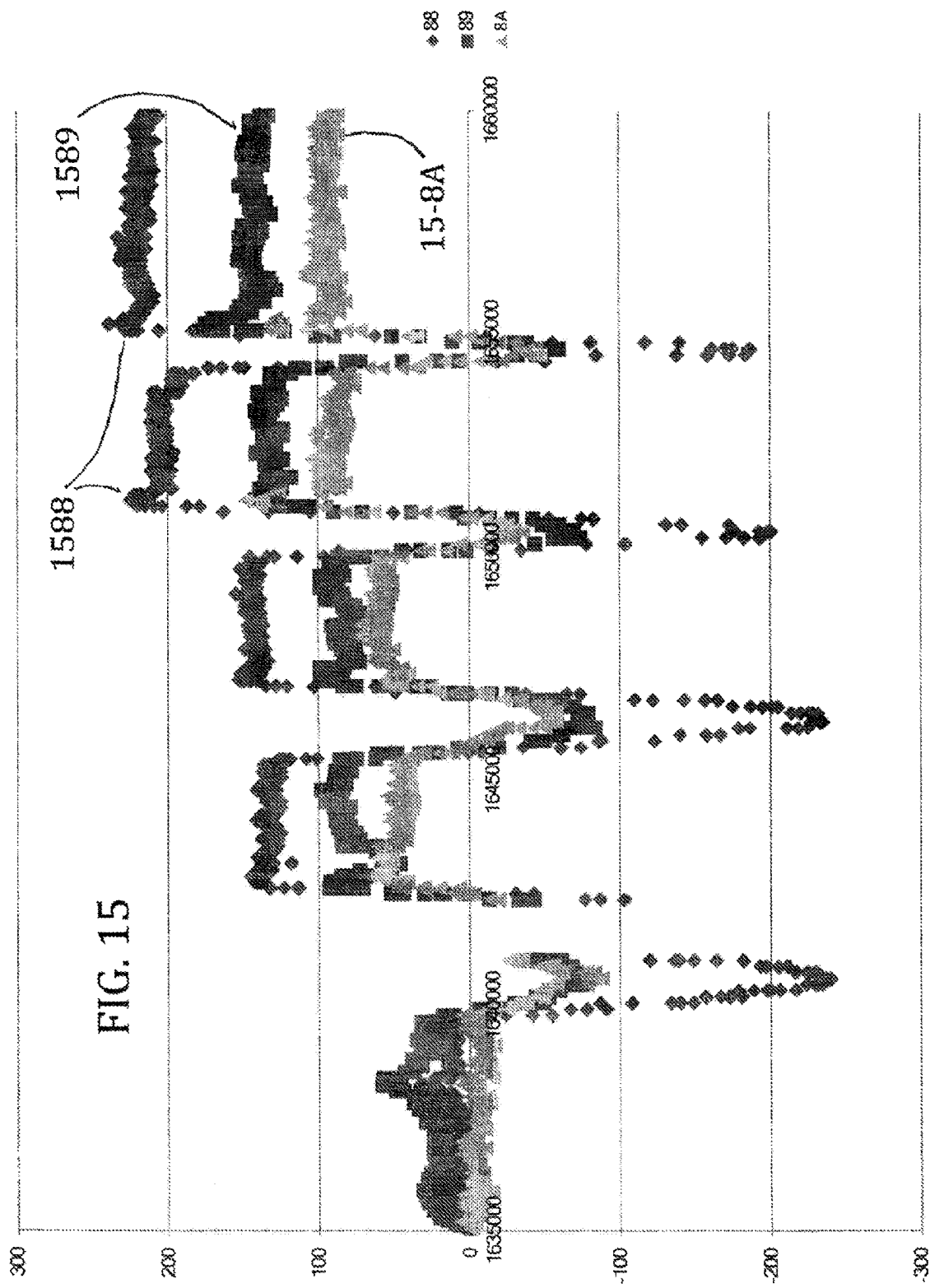
FIGS. 15 and 16 are graphical illustrations of some data from reading a row of three tags with two different motions.
Figure 16:
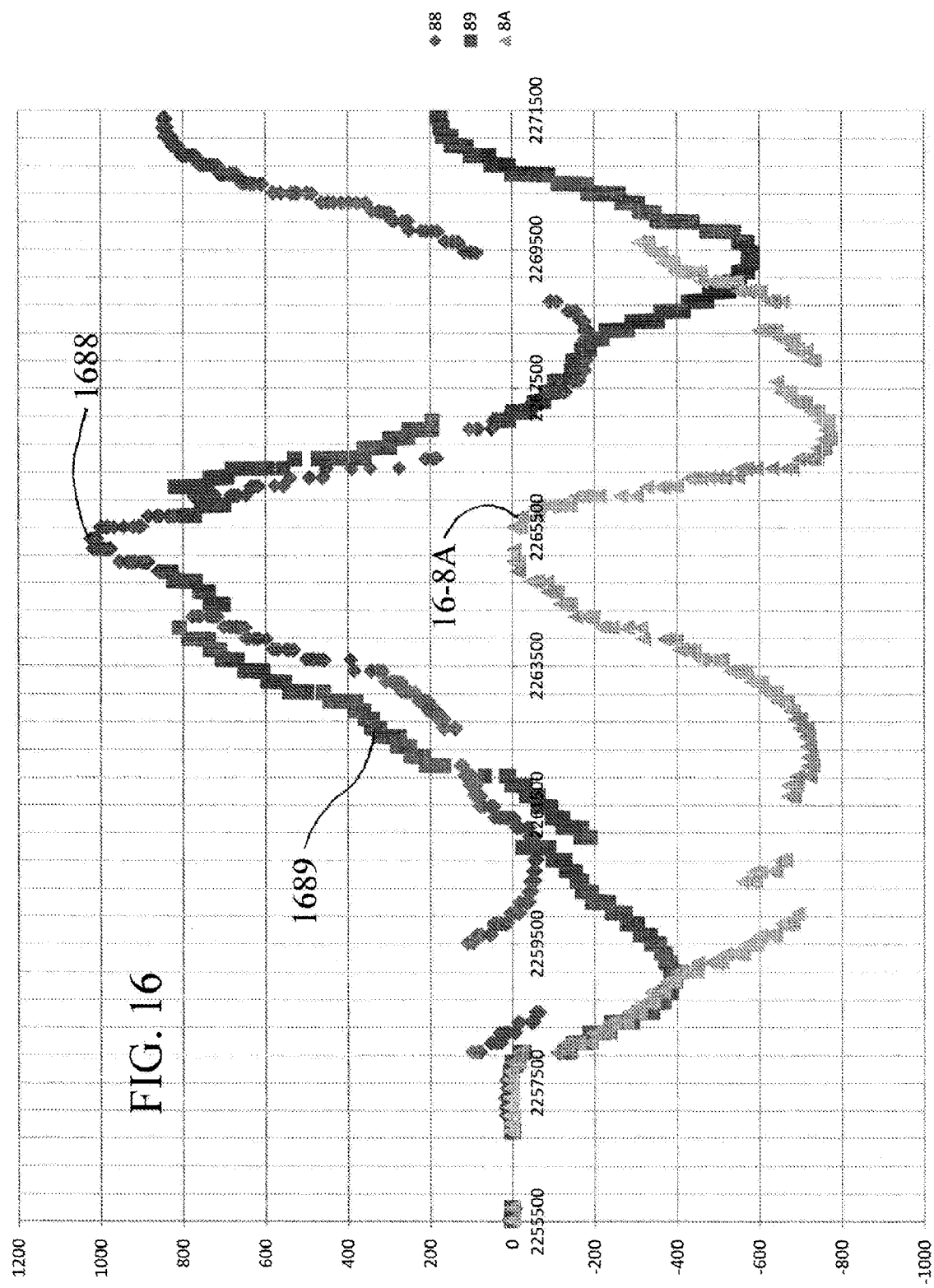

Description of FIGS. 15 and 16

A robotic system such as 1070, FIG. 10, may be used for moving an antenna system of an RFID reader relative to tags which are to be assembled in the load e.g. on a pallet such as 1020. FIGS. 15 and 16 show the phase information as a handheld RFID reader is moved across a row of three tags represented by symbols designated 88, 89, and 8A. at the right of the figures. FIG. 15 shows the unwrapped phase change for forward and back motion of the reader transverse to the row of tags. The tag represented by the symbol 88 is the one in front of the reader since the phase deltas of the corresponding waveform 1588 are the largest. The relative position of the other two tags cannot be determined from their corresponding waveforms 1589 and 15-8A since they are fairly equidistant from the reader.

FIG. 16 shows the unwrapped phase change for the horizontal sweep (left to right, right to left) of the row of tags. The tag represented by the symbol 88 is in the center since the phase delta valley of waveform 1688 is in the middle of the valley for waveforms 1689 and 16-8A for the tags represented by symbols 89 and 8-A. The tag represented by symbol 89 is the leftmost tag since its waveform 1689 produces the first and last valley, then the tag represented by symbol 88, and then the tag represented by symbol 8A although there is some kind of distortion happening. These data are not as precise as would be possible with robotic movement of the reader since human motion is not as repeatable and consistent as that of a robot. In a robotic system where the tags or the reader could be moved very precisely, it would be possible to determine the relative positions of a set of tags with very high accuracy by moving either the reader antenna or the tags while recording the phase information.

If a robotic system could control a conveyor belt and move a tagged item until it determined that it was in front of the antenna and then move it back and forth in small increments to add confidence that was the item in front, then the serial order of the conveyor belt items could be known, and could be used to identify tagged items being transferred by the robotic system 1070 to the load at 1030. For airline baggage tracking applications when it is desired to know what order the bags are in, the same procedure could be used.

In moving the reader or set of tagged items, the robotic system could itself move and derive its position with the use of a reader accurately positioned on the robot if there are location tags distributed throughout the warehouse for example. A robot system enabled with an RFID reader could use signal information from nearby tags in order to know relative position. With KIVA Systems robots, for example, it would be beneficial to use a localized location system, e.g., if the floors are not exactly flat and there is accumulated position error. A form of RFID localization with distributed localization tags could be used to account for all of the small variation inherent in robot motion to provide greater confidence in location.

Figure 17:
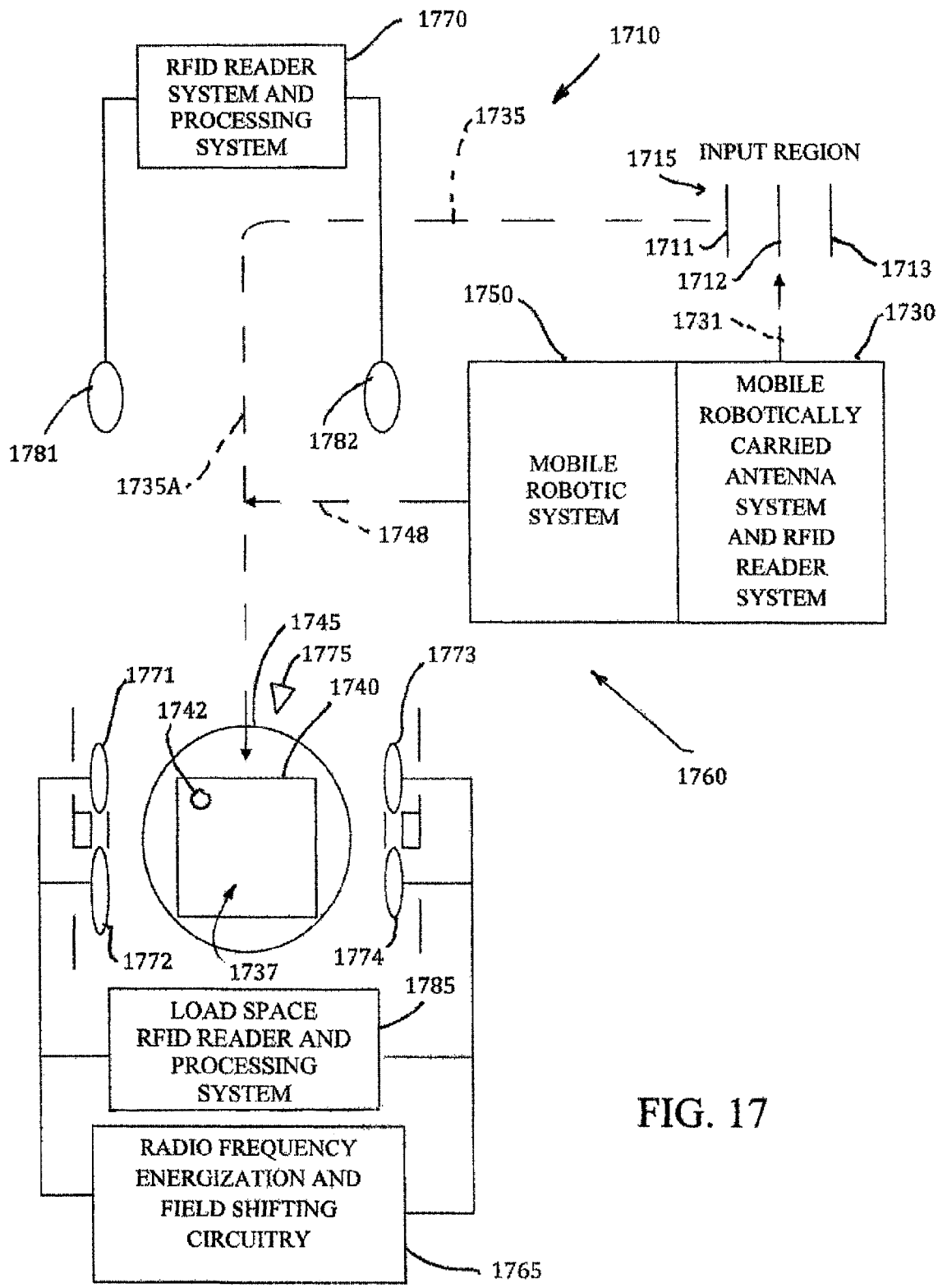
FIG. 17 is a diagrammatic illustration of a system for identifying tagged items as they are assembled as a load on a transport device.

Description of FIG. 17

FIG. 17 illustrates a load staging area 1710 which receives tagged items such as 1711-1713 at an input region 1715. In one example a mobile robotically carried antenna system and an RFID reader system 1730 may read the items such as 1711-1713 at the input station 1715 as represented by dash line arrow 1731.

A dash line 1735 indicates a path of the tagged item or items to a load receiving space 1737 which may be associated with a pallet or load transporter 1740. FIG. 17 may be taken as illustrating the load receiving space 1737 as being above the support surface of the pallet 1740 with any required radio frequency permeable means confining the tagged items. The pallet may have a pallet tag 1742. The pallet or load transporter may be carried by a mobile robotic transport device 1745 which may rotate continuously on its central vertical axis to assist in maintaining the identified tagged items in the load receiving space 1737 exposed to an activating field produced by the RF energization component of circuitry 1765 and antennas 1771-1774, and/or to provide a unique path of motion for the tagged items to assist in distinguishing tagged items in the load space 1737 from extraneous tags as explained with reference to FIG. 12. A dash line 1748 indicates that a mobile robotic system 1750 may transport a tagged item or items along the path 1735 including vertical path portion 1735A to the load receiving space 1737.

Embodiments with RFID Reader System at the Load Space.

In one embodiment an RFID reader system generally indicated by reference numeral 1760 for the staging site 1710 may comprise a load space RFID reader system 1785 with antennas such has 1771-1774 directed at the load space 1737. The field shifting portion of component 1765 may activate antennas 1771-1774 to produce rotational or shifting reading fields as disclosed with reference to FIGS. 6 and 7, thereby to enhance the tag reading and identification.

In the embodiment utilizing the load space RFID reader system 1785 to identify true tags that are of interest and exclude extraneous tags, the tag readings may be taken as the tagged item or tagged items arrive along vertical path 1735A and/or while the tagged items are supported by the pallet 1740 within the load receiving space 1737. As explained herein, examples of motional rate parameters of the true tags may comprise one or more of scalar or vector values of velocity, acceleration, or jerk. Also motional patterns such as shown in FIGS. 11-14, and spacial location within the load receiving space 1737 may be used. The motion or location data from the tag readings may be compared with the known motion parameter or parameters or location of the true tags being delivered to be part of the load or already part of the load. Rotation of the transport device 1740 e.g. by means of mobile robotic transport device 1745 can introduce a further motional parameter, to be compared with the results of the tag readings for a given tag. The antenna system directed at load receiving space 1737 may correspond to that of FIG. 5, as another example.

Embodiments with Reading Antennas Along the Path of the Tagged Item and Above the Load Receiving Space In another embodiment the site RFID reader system generally designated with reference numeral 1760 may comprise an RFID reader system and processing system 1770 which may have antennas 1781 and 1782 e.g. along the vertical path portion 1735A so as to obtain tag readings from which the motional characteristics of a tagged item traversing the field of antennas 1781 and 1782 can be determined by the processing system of component 1770.

As in prior embodiments, e.g. FIGS. 10-14, a mobile robotic system 1750 may be programmed to move the tagged item or items along the vertical path 1735A at a given motional rate or with a given motional path pattern and such information may be available to the processing system of component 1770 as input data for comparison with the processed tag readings. In this case, the mobile robotically carried antennae system and RFID reader system of component 1730 may identify the tagged items at the input region 1715 and transmit this information to the RFID reader system and processing system 1770 so that the reader system of component 1770 can utilize the identity information in obtaining tag readings for the identified tagged items.

The robots of systems 1730 and 1750 may have a communication system for receiving instructions by human voice e.g. so as to execute the instructions mentioned in reference to FIG. 10, e.g. from the supervisory system 1090, and to select different modes of operation and different motional parameters. The robots of systems 1730 and 1750 may also have a communication system for responding using human speech, e.g. to acknowledge instructions.

When a tagged item is delivered to the load receiving space 1737, the radio frequency energization portion of component 1765 can function to supply activating energy to the sets of antennas 1771-1772 and 1773-1774 e.g. to generate non-reading RF activating fields as was explained in relation to FIGS. 8A, 8B, and component 1065 of FIG. 10. The antennas 1771-1774 may driven by the field shifting circuitry of component 1765 to effect rotational movement or switched reflectors as explained with reference to FIGS. 6 and 7, and/or the robotic transport 1745 can be continuously rotated on its central vertical axis, so as to shift the non-reading RF fields and better maintain the active powered status of identified tags in the load receiving region 1737.

Camera Monitoring of the Load Receiving Space 1737

A camera such as 1775 pointed at the pallet could be used for volumetric dimensioning in which laser infrared dots are projected on the pallet in order to determine the volume of tagged items on the pallet. When the volume of the pallet changes the RFID reader system 1785 could be triggered to determine what the new tag ID is of the item added to the load. This way the system can record not only the items on the pallet, but their relative positioning on the pallet, i.e. top, bottom. This information could be utilized as the pallet is transported throughout the supply chain. Also, if image detection is used, then the RFID reader could select the best antenna based on where the item is added to the pallet. When the pallet is loaded in a truck with multiple antennas or steerable antennas the approximate location of each tag would be known and could be used to systematically interrogate the entire load in transport.

Monitoring Successive Positions of Mobile Robots e.g. for Systems 1730 and 1750

Also in systems where the reader or tagged item is being moved by a robot, the robot could move itself and derive position information if there are location tags distributed throughout the warehouse for example. A robot system enabled with a RFID reader could use signal information from nearby tags in order to know relative position. KIVA systems robots could benefit from a localized location system where the floors aren't exactly flat and there is accumulated position error. This form of RFID could be used to account for all of the small variation inherent in robot motion to provide greater confidence in location.

Figure 18:
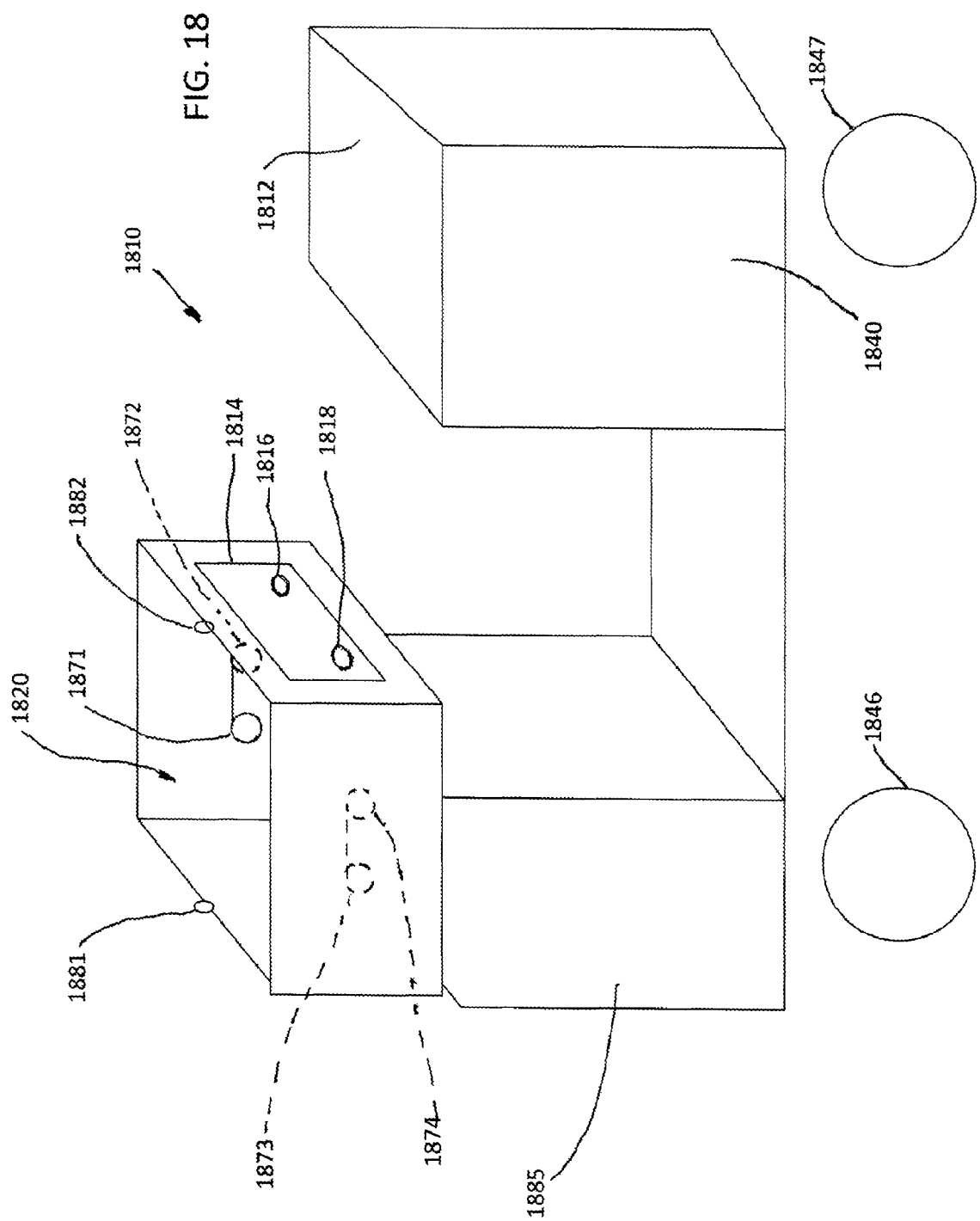
FIG. 18 is a diagrammatic illustration of a vehicle for collecting tagged items, e.g. a shopping vehicle, utilizing features of the present disclosure.

Description of FIG. 18

FIG. 18 illustrates a transport vehicle for use in assembling a load, e.g. a shopping vehicle 1810. In the illustrated embodiment the vehicle has a seat area 1812 for a passenger or driver and a display screen area 1814 for communicating visual information to the person on seat 1812. Also provided are a voice input such as a microphone 1816 and a voice output such as a loudspeaker 1818. The vehicle is shown as provided with a load receiving space 1820, with an antenna system including antennas such as 1871-1872 and 1873-1874 on respective sides of the load receiving space 1820 which may be analogous to the antenna system 1771-1774 of FIG. 17. The antenna system may be coupled with a load space RFID reader system and processing system component e.g., located in an enclosure 1885, and analogous to load space RFID reader system 1785 of FIG. 17, and also may be coupled to a radio frequency energy and field shifting system component located in enclosure 1885, and analogous to component 1765 of FIG. 17. A suitable battery power supply for the system components may be located in the enclosure 1865. The vehicle may also be provided with antennas such as indicated at 1881 and 1882 analogous to the antennas 1781 and 1782 of FIG. 17, coupled with a radio frequency identification reader system and processing system component analogous to component 1770 of FIG. 17. The vehicle may have a robotic drive and navigation system located within enclosure 1840, with a battery power supply, for driving and steering wheels such as indicated at 1846-1847.

A humanoid robot (not shown) may accompany the vehicle 1810 and the robot may respond to human voice instructions from the vehicle passenger to select various items e.g. from shelves or the like, and may communicate by human voice to the passenger to advise of the cost of a selected item or the like. Alternatively a robotic arm (not shown), e.g. of articulated or telescoping construction, may be voiced controlled and include suitable video camera (not shown) and the like for guiding the robotic arm to a desired item. The robotic arm may be equipped with suitable means for engaging a selected item and placing it in the load receiving space 1820. Such items may be equipped with radio frequency identification tags as in the prior embodiments, and the robotic system may place the selected item into the load receiving space 1820 via a selected path or with selected motional rate parameters such as disclosed with reference to FIGS. 10-14 and 17 so as to distinguish tag readings for the selected tagged item from surrounding extraneous tagged items. The identified items placed in the load receiving space 1820 may be included in a list of items in the load receiving space. Items as placed in the load receiving station are available for itemization on the display screen 1814. Items as identified with the use of antennas 1771-1774 and/or 1881 and 1882 would remain in the identified status and may be energized by means of a non-reading energizing circuitry component of enclosure 1885 which activates antennas 1871-1874. In the case of a shopping vehicle, the tagged items would have their tags energized so as to retain their identification until such time as the items are paid for and removed from the facility.

The non-reading energizing circuitry component of enclosure 1885 may energize the antennas 1871-1874 periodically in such a way as to ensure that the tags retain their status as identified. For example, if the activating fields of antennas 1871-1874 shift periodically, the activating fields would be directed in a given direction with a period less than the persistence time of the tags to insure that the tags would remain in the identified status.

The receiving space 1820 may be enclosed by walls having radio frequency absorbing characteristics so as to minimize or avoid any reflection problems that might adversely affect radio frequency identification of tags within the load receiving space.

Supplemental Discussion

True Tag Motional Information and/or Locational Information

The disclosure of the incorporated published patent application US 2009/0207024 with respect to true tag motional information, for example, at paragraphs 0028-0030, it is specifically applied to each of the embodiments herein e.g. comprising step 110, FIG. 1, FIGS. 2A-2C, components 325, 330, FIG. 3, components 435, 430, FIG. 4, FIG. 6 e.g. with antenna system 630, FIG. 7 e.g. with antenna system 730, and steps 802-805, and/or step 811, FIG. 8. With respect to locational information, the disclosure of the incorporated published patent application US 2009/0207024, for example at paragraphs 0021-0024, is specifically applied to each of the embodiments herein e.g. comprising FIGS. 2A-2C, FIG. 6 e.g. with antenna system 630, FIG. 7, e.g. with antenna system 730, and steps 805 and 811, FIG. 8, Tag Locational Data and/or Motional Data The disclosure of the incorporated published application US 2009/0207024 with respect to obtaining tag motional data and locational data from tag readings for example at paragraphs 0033-0053, it is hereby specifically applied to each of the embodiments herein e.g. comprising component 120, FIG. 1, FIGS. 2A-2C, components 335, 340, 345, FIG. 3, components 435, 440, 445, FIG. 4, FIG. 5, FIG. 6, e.g. with antenna system 630, FIG. 7, e.g. with antenna system 730, steps 802-805, 809 and/or 811, FIG. 8, FIGS. 10-14, FIG. 17 and FIG. 18.

Processing System Embodiments

The disclosures of the incorporated published patent application US 2009/0207024 with respect to the processing systems of FIGS. 1, 2, 3A-3C, 8, 9 and 10 of the published patent application are hereby specifically applied as being operatively associated with each of the embodiments herein e.g. comprising FIGS. 1, 2A-2C, 5-8, component 1060, FIG. 10, FIGS. 11-14, component 1770 and/or component 1785, FIG. 17, and with antenna systems 1871-1874 and/or 1881-1882, FIG. 18.

Excitation Systems

The disclosures of the incorporated published patent application US 2008/0111688 comprising RF power source 110, FIG. 1A and FIG. 1B, component 203, FIGS. 2A and 2B, components 303, 306, FIG. 3, the tag of FIG. 6A, and the embodiment of FIG. 7 are specifically applied to provide excitation energy in each of the embodiments herein, for example, as indicated at 1065, FIG. 10, and at 1765 in FIG. 17.

One problem with the implementation of the RFID shopping cart of U.S. Pat. Nos. 5,729,697 and 6,032,127, which patents are hereby incorporated herein by reference, is the assumption that the RF field will not be permitted to penetrate or penetrate very little beyond one or more sides of the cart (U.S. Pat. No. 5,729,697, section 3, second paragraph). In practice it is very difficult to achieve that specific control over the RF field. Even when the system is designed to control the RF field in this manner the field could be altered by items placed in the cart which could result in reading unwanted tags nearby the cart. Where an item placed in the cart may result in the inability to read tags in the cart, it is advantageous to have antennas at locations such as 1881, 1882 which can read tags as they enter and leave the receptacle. The associated reader system would determine the direction of movement of such a tag coming within the field of view. Also every generation of passive tag is becoming twice as sensitive, sensitivity being the minimum amount of power required for the passive tag to become energized and backscatter a response, as the previous generation. Also the emergence of battery assisted passive tags that are far more sensitive than passive tags adds even more complexity to the stray tag problem. Even the most tightly confined RF field would likely pick up undesired tags that are not from items contained in the cart.

One way to solve this problem would be to use the same approach used herein for a dock door portal in the warehouse but in reverse. For the dock door case the tags are moving through the field and the reader is stationary. The only tags of interest in this case are the tags that are moving, not the stationary tags that can be read nearby the portal. In the case of the shopping cart reader the only tags of interest, the tags in the cart, are the tags that appear to be stationary relative to the antenna(s) on the cart. The same phase difference of arrival techniques can be applied to the shopping cart system as the portal system where multiple phase measurements are made from the backscattered signal of the tag to determine if the tag is in motion or not relative to the antenna. The time domain phase difference of arrival (TD-PDOA) method makes it possible to know relative motion of the tag with respect to the antenna.

Additionally the use of motion sensors on the shopping cart computer could be used to indicate to the system that the cart is in motion. When the cart is at rest then all nearby tags will appear to be stationary with respect to the antenna and the discrimination of tags in the cart from nearby tags is not possible, without e.g. also determining that a tag is located within the shopping cart as taught in the incorporated US 2009/0207024, and/or detecting the tagged article as it is moving into the cart receptacle. Once the cart is in motion then the tags in the cart can be interrogated based on motion of the cart antenna relative to stray tags. Now all items in the cart should have constant phase while the tags outside the cart will have changing phase values. This method can provide added confidence to the system that the items are in fact in the cart.

The reader could interface with an optical system e.g. located at 1881, 1882, FIG. 18, utilizing computer vision, and/or the antennas at 1881, 1882 could be used, to determine when an item is being added to the cart. Once movement e.g. in the frame of vision of the optical system or in the RF field is detected the reader could be actuated to begin interrogation e.g. via antennas 1871-1874 looking particularly for the moving tag entering the cart while others would appear stationary. The antennas at 1881, 1882 could be used to detect removal of an item from the cart. The optical system could be used as an actuator to trigger the reader to the active state when a tag is entering or leaving the shopping cart. The reader could then deactivate antennas 1881, 1882 once a tag is identified as entering or leaving the cart.

One more method (in addition to those described above) to tell which items are in your cart (vs. a neighbor's cart), would be to attach one well readable tag to each cart, and then, as the cart is moved, compare the acceleration profiles (obtained from phase readings over time) from that tag with other tags. These profiles would be unique for each cart (because even tiny deviations from uniform motion will result in big acceleration changes for tags not moving with the cart as seen by the cart reader) but will be very similar for all items in a given cart (because they all move as a whole). It would be somewhat analogous to solving the false positives for forklifts, but measuring motion in a different way. The motion may be measured using e.g. time domain phase difference of arrival, or motion may be measured based on a Doppler shift of a modulated backscatter signal from the tags moving relative to the cart antenna, for example, to determine which tags are not moving with the cart antenna.

A store reader could read an RFID tag on each cart to determine its identity, and identify the speed and direction of movement of the cart e.g. based on Doppler shift of a modulated backscatter signal from the cart tag.

For example, a store computer may store the identity of all the RFID tags that have been itemized in each of the respective carts on a dynamic basis, and the store computer may communicate with a robot pushing a cart which robot may use human speech to talk to the customer about the running total cost for the goods in the cart and so on, instead of, or in addition to, a speaker or audio/video output on the cart controlled from the store computer.—e.g. using a cart robot that is special to the customer, etc.

A robot accompanying a shopping cart, or assembling tagged items for a load at space 1737, FIG. 17, may have a very low power reader for reading only an item being loaded by the robot and/or may read the relative movement of the tag during loading to be certain only the desired tag is registered as being added to the cart receptacle or other load space. With the robot carrying the reader or presenting the tagged item to a reader, the robot may control an actuator for triggering the scanning of an item being added to or removed from the load space, and then move the item with a predetermined motional characteristic as described herein to assure identification of the correct item.

The words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while an RFID reader for reading RFID tags are mentioned, any reading apparatus for reading devices emitting radio-frequency signals may be used under the principles disclosed herein.

The teachings of the invention provided herein can be applied to other systems, not necessarily the system described above. The elements and acts of the various embodiments described above can be combined to provide further embodiments.

While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

The invention claimed is:

1. A radio frequency identification system comprising
a load transporter having a load receiving space for receiving a radio frequency identification tagged item with a true tag, moved from an external region external to the load receiving space to the load receiving space of the load transporter;
a radio frequency identification reader system for taking tag readings during movement of the true tag along a path from the external region to the load receiving space of the load transporter; and
a processing system having true tag motional information as to predetermined or measured movement of the true tag along said path from the external region to the load receiving space, and comparing tag motional data based on the tag readings with the true tag motional information to establish whether the tag readings represent a true tag moving along said path to the load receiving space or represent an extraneous tag.

2. A radio frequency identification system according to claim 1, with said radio frequency identification reader system marking a true tag being delivered along said path or being within said load receiving space as identified so that the true tag does not respond thereafter during reading of further tags within the reading field of the radio frequency identification reader system.

3. A radio frequency identification system according to claim 1, with said radio frequency identification reader system marking true tags which are not extraneous as identified, and providing an activating radio frequency field for maintaining the status of such true tags which are not extraneous, as identified.

4. A radio frequency identification system according to claim 1, wherein a robotic system effects the predetermined or measured movement of the radio frequency identification tagged item with the true tag along the path to the load receiving space.

5. A radio frequency identification system according to claim 1, with the load transporter comprising a shopping vehicle.

6. A radio frequency identification system according to claim 1, further comprising an antenna system for projecting a radio frequency activating field to the load receiving space for maintaining a powered status of true tags in the load receiving space of the load transporter.

7. A radio frequency identification system according to claim 6, wherein the radio frequency activating field maintains the status of true tags in the load receiving space as identified while the orientation of the activating field relative to the true tags is shifted.

8. A radio frequency identification system according to claim 1, with a position reading system for reading the position of a radio frequency identification tagged item with a true tag in the load receiving space.

9. A radio frequency identification system according to claim 8, with the position reading system projecting laser light into the load receiving space.

10. A radio frequency identification system according to claim 8, wherein a record of the position of tagged items in the load receiving space is maintained.

11. A radio frequency identification system according to claim 1, wherein a count of the number of tagged items in the load receiving space is maintained as successive tagged items are added to the load receiving space or removed from the load receiving space.

12. A radio frequency identification system according to claim 2, wherein a non-reading activating field is applied to true tags of the load receiving space to maintain their status as identified.

13. A radio frequency identification system according to claim 4, wherein said radio frequency identification system comprises an external radio frequency identification antenna system carried by the robotic system which is used to identify tagged items in the external region.

14. A radio frequency identification system according to claim 13, with said external radio frequency identification antenna system serving to determine the order of serially arranged tagged items in the external region.

15. A radio frequency identification system according to claim 4, wherein an energization system of the robotic system supplies a non-reading activating field to maintain the status of identified tagged items during transport from the external region.

16. A radio frequency identification system according to claim 1, wherein a list of the true tags in the load receiving space is maintained as successive tagged items are added to the load receiving space or removed from the load receiving space.

17. A radio frequency identification system for distinguishing a true radio frequency identification tag from an extraneous tag, said radio frequency identification system comprising: a radio frequency identification reader system configured to scan for a radio frequency identification tag within a read zone of the radio frequency identification reader system and producing tag readings therefrom, wherein the read zone at least partially overlaps with a true radio frequency identification tag; a data system configured to at least assist in determining tag motional data based on the tag readings of the radio frequency identification reader system taken during movement of the true radio frequency identification tag; and a processing system communicatively coupled to the data system, wherein the processing system is configured to compare the tag motional data based on the tag readings with true tag motional information to determine whether the tag readings are from the true radio frequency identification tag.

18. A method of distinguishing a true radio frequency identification tag of interest from an extraneous tag comprising: determining true tag motional information as a function of movement of the true radio frequency identification tag within a read zone of a radio frequency identification reader system; obtaining tag readings for a radio frequency identification tag in the read zone of a radio frequency identification reader system to monitor movement of a radio frequency identification tag within the read zone; obtaining radio frequency identification tag motional data from the tag readings; and determining whether the radio frequency identification tag is the true radio frequency identification tag or is an extraneous tag based upon the tag motional data in comparison to the true tag motional information.

19. The method of claim 18, wherein a path of movement of a true radio frequency identification tag in the read zone has a substantial vertical component and movement along the path is monitored by obtaining tag readings for the radio frequency identification tag for successive points along the path where the path has a substantial vertical component, to obtain the tag motional data.

20. The method of claim 18, wherein movement based on the tag readings is monitored to obtain tag motional data which is a measure of a tag motional rate.

* * * * *